United States Patent
Nadathur et al.

(10) Patent No.: US 12,463,842 B2
(45) Date of Patent: Nov. 4, 2025

(54) SELECTION OF A COORDINATOR DEVICE FOR AN AUTOMATED ENVIRONMENT

(71) Applicant: Apple Inc., Cupertino, CA (US)

(72) Inventors: Anush G. Nadathur, Campbell, CA (US); Srinivas Rama, Cupertino, CA (US); Matthew C. Lucas, San Jose, CA (US); Nathan E. Carroll, San Francisco, CA (US); Kevin P. McLaughlin, Waikoloa, HI (US); Thomas A. Dilligan, Cupertino, CA (US); Arun G. Mathias, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 140 days.

(21) Appl. No.: 17/393,163

(22) Filed: Aug. 3, 2021

(65) Prior Publication Data
US 2022/0006662 A1     Jan. 6, 2022

Related U.S. Application Data

(63) Continuation of application No. 16/816,709, filed on Mar. 12, 2020, now Pat. No. 11,088,862, which is a
(Continued)

(51) Int. Cl.
*H04L 12/28* (2006.01)
*H04L 43/0811* (2022.01)
(Continued)

(52) U.S. Cl.
CPC ...... *H04L 12/2803* (2013.01); *H04L 12/2816* (2013.01); *H04L 43/0811* (2013.01); *H04L 67/303* (2013.01); *H04W 84/18* (2013.01)

(58) Field of Classification Search
None
See application file for complete search history.

(56) References Cited

U.S. PATENT DOCUMENTS

| | | |
|---|---|---|
| 6,092,214 A | 7/2000 | Quoc et al. |
| 6,243,826 B1 | 6/2001 | Quoc et al. |

(Continued)

FOREIGN PATENT DOCUMENTS

| | | |
|---|---|---|
| CN | 1529502 A | 9/2004 |
| CN | 1863110 A | 11/2006 |

(Continued)

OTHER PUBLICATIONS

"Notification of Second Office Action," mailed Oct. 11, 2021 in Chinese Patent Application No. 201910914426.0. 14 pages (includes English translation).
(Continued)

*Primary Examiner* — Lance Leonard Barry
(74) *Attorney, Agent, or Firm* — Kilpatrick Townsend & Stockton LLP

(57) ABSTRACT

An automated environment can include multiple controller devices capable of communicating with multiple accessory devices. The controller devices can automatically elect one of their number as a coordinator device for the environment and can automatically perform a new election if an incumbent coordinator becomes unavailable or resigns. The election processes can be transparent to any users. An elected coordinator can perform various operations to facilitate management of the automated environment, including routing of communications between controllers and accessories.

20 Claims, 10 Drawing Sheets

Related U.S. Application Data continuation of application No. 16/287,835, filed on Feb. 27, 2019, now Pat. No. 10,630,500, which is a continuation of application No. 15/274,353, filed on Sep. 23, 2016, now Pat. No. 10,270,610.

(60) Provisional application No. 62/348,994, filed on Jun. 12, 2016.

(51) Int. Cl.
*H04L 67/303* (2022.01)
*H04W 84/18* (2009.01)

(56) References Cited

U.S. PATENT DOCUMENTS

| | | | |
|---|---|---|---|
| 6,823,519 | B1 | 11/2004 | Baird et al. |
| 6,956,941 | B1 * | 10/2005 | Duncan ................ H04M 3/523 |
| | | | 379/266.01 |
| 9,680,646 | B2 | 6/2017 | Nadathur et al. |
| 9,979,625 | B2 | 5/2018 | McLaughlin et al. |
| 10,719,122 | B2 | 7/2020 | Marti et al. |
| 2002/0184532 | A1 | 12/2002 | Hackenberger et al. |
| 2003/0149735 | A1 * | 8/2003 | Stark ........................ H04L 9/40 |
| | | | 714/4.11 |
| 2004/0249942 | A1 | 12/2004 | Chatterjee et al. |
| 2005/0075084 | A1 * | 4/2005 | Salokannel ....... H04W 52/0219 |
| | | | 455/126 |
| 2005/0182967 | A1 | 8/2005 | Phillips et al. |
| 2005/0187963 | A1 | 8/2005 | Markin |
| 2008/0077716 | A1 * | 3/2008 | Sawai ..................... G06F 13/28 |
| | | | 710/23 |
| 2008/0279160 | A1 * | 11/2008 | Qin ........................ H04N 7/163 |
| | | | 370/338 |
| 2009/0038015 | A1 | 2/2009 | Diamant et al. |
| 2009/0290572 | A1 * | 11/2009 | Gonia ................... H04J 3/0641 |
| | | | 370/350 |
| 2010/0030819 | A1 | 2/2010 | Srinivasan et al. |
| 2010/0086076 | A1 | 4/2010 | Lakkis |
| 2011/0096756 | A1 | 4/2011 | Abramov et al. |
| 2011/0138467 | A1 | 6/2011 | Macwan et al. |
| 2012/0078452 | A1 * | 3/2012 | Daum ....................... B61L 3/20 |
| | | | 701/19 |
| 2013/0080615 | A1 | 3/2013 | Lee et al. |
| 2013/0275198 | A1 * | 10/2013 | Zeto, III ............ G06Q 30/0225 |
| | | | 705/14.26 |
| 2015/0222517 | A1 | 8/2015 | McLaughlin et al. |
| 2015/0351145 | A1 | 12/2015 | Burks et al. |
| 2016/0091871 | A1 | 3/2016 | Marti et al. |
| 2016/0091879 | A1 | 3/2016 | Marti et al. |
| 2016/0132030 | A1 | 5/2016 | Marti et al. |
| 2016/0143077 | A1 | 5/2016 | Fodor et al. |
| 2017/0085626 | A1 | 3/2017 | Chang |
| 2017/0163521 | A1 | 6/2017 | Hu |
| 2017/0272316 | A1 | 9/2017 | Johnson et al. |
| 2017/0279497 | A1 | 9/2017 | Schultz et al. |
| 2017/0346630 | A1 | 11/2017 | Nadathur et al. |
| 2017/0359190 | A1 | 12/2017 | Nadathur et al. |
| 2018/0113716 | A1 | 4/2018 | Das et al. |

FOREIGN PATENT DOCUMENTS

| | | | | |
|---|---|---|---|---|
| CN | 101512981 | A | 8/2009 | |
| CN | 101513100 | A | 8/2009 | |
| CN | 101800752 | A | 8/2010 | |
| CN | 102148731 | A | 8/2011 | |
| CN | 104301905 | A | 1/2015 | |
| CN | 104836709 | A | 8/2015 | |
| CN | 105308630 | A | 2/2016 | |
| CN | 105471648 | A | 4/2016 | |
| KR | 20150067365 | A * | 3/2008 | |
| RU | 2207724 | C1 * | 6/2003 | .............. H01Q 3/24 |
| WO | 2017/218176 | A1 | 12/2017 | |

OTHER PUBLICATIONS

Application No. CN201910914426.0, Notice of Decision to Grant, Mailed on Mar. 30, 2022, 5 pages.
Invitation to Pay Additional Fees and Partial Search Report mailed Aug. 10, 2017 In International Application No. PCT/US2017/035003. 13 pages.
Guzzo, Natale et al., "A Cluster-Based and On-Demand Routing Algorithm for Large-Scale Multi-Hop Wireless Sensor Networks." HAL ID: hal-01057738. Downloaded from https://hal.inria.fr/hal-01057738. Original document submitted Sep. 22, 2014. 12 pages.
International Search Report and Written Opinion mailed Oct. 5, 2017 in International Application No. PCT/US2017/035003. 19 pages.
International Preliminary Report on Patentability mailed Dec. 27, 2018 in International Application No. PCT/US2017/035003. 11 pages.
Non-Final Office Action mailed Jun. 1, 2018 in U.S. Appl. No. 15/274,353. 11 pages.
Notice of Allowance mailed Dec. 6, 2018 in U.S. Appl. No. 15/274,353. 13 pages.
First Office Action mailed Feb. 19, 2019 in Chinese Patent Application No. 201780020793.5. 11 pages (includes English translation).
Notification of Decision to Grant mailed Jul. 11, 2019 in Chinese Patent No. ZL201780020793.5. 5 pages, includes English translation of the claims.
Non-Final Office Action mailed Sep. 16, 2019 in U.S. Appl. No. 16/827,835. 12 pages.
Notice of Allowance mailed Feb. 26, 2020 in U.S. Appl. No. 16/827,835. 7 pages.
Decision to grant mailed Jul. 18, 2019 in European Patent Application No. 17730612.3-1216 / 3420780. 2 pages (includes English translation).
Notification of the First Office Action, mailed Mar. 16, 2021 in Chinese Patent Application No. 201910914426.0. 17 pages (includes English translation).
Non-Final Office Action mailed Nov. 27, 2020 in U.S. Appl. No. 16/816,709. 14 pages.
Notice of Allowance mailed Apr. 7, 2021 in U.S. Appl. No. 16/816,709. 10 pages.
Notice of Allowance mailed Apr. 26, 2021 in U.S. Appl. No. 16/816,709. 4 pages.
"Notice of Allowance," mailed Aug. 17, 2023 in U.S. Appl. No. 18/101,295. 12 pages.
"Notification of the First Office Action," mailed Nov. 24, 2023 from the Chinese Patent Office in Application No. 202210659522.7. 13 pages (includes English translation).
Chinese Patent Application No. CN202210659522.7, Office Action, Mailed on Oct. 14, 2024, 13 pages (8 pages of English translation and 5 pages of official language copy).
Chinese Patent Application No. CN202210659522.7, Office Action, Mailed on Aug. 4, 2024, 11 pages (7 pages of English Translation and 4 pages of Official Copy).
Chinese Patent Application No. CN202210659522.7, Office Action, Mailed on Dec. 25, 2024, 12 pages (7 pages of English translation and 5 pages of official language copy).

* cited by examiner

SELECTION OF A COORDINATOR DEVICE FOR AN AUTOMATED ENVIRONMENT

CROSS-REFERENCES TO RELATED APPLICATIONS

The present disclosure is a continuation of U.S. patent application Ser. No. 16/816,709, filed Mar. 12, 2020 (now U.S. Pat. No. 11,088,862 issued Aug. 10, 2021) entitled "SELECTION OF A COORDINATOR DEVICE FOR AN AUTOMATED ENVIRONMENT," which is a continuation of U.S. patent application Ser. No. 16/287,835, filed Feb. 27, 2019 (now U.S. Pat. No. 10,630,500 issued Apr. 21, 2020) entitled "SELECTION OF A COORDINATOR DEVICE FOR AN AUTOMATED ENVIRONMENT," which is continuation of U.S. patent application Ser. No. 15/274,353, filed Sep. 23, 2016 (now U.S. Pat. No. 10,270,610 issued Apr. 23, 2019) entitled "SELECTION OF A COORDINATOR DEVICE FOR AN AUTOMATED ENVIRONMENT," which is a non-provisional of and claims the benefit and priority under 35 U.S.C. 119(e) of U.S. Provisional Application No. 62/348,994 filed Jun. 12, 2016 entitled "SELECTION OF A COORDINATOR DEVICE FOR AN AUTOMATED ENVIRONMENT," the entire contents of which is incorporated by reference herein in its entirety. This disclosure is also related to the following U.S. patent applications: application Ser. No. 14/614,914 filed Feb. 5, 2015 (now U.S. Pat. No. 9,979,625); application Ser. No. 14/725,891 filed May 29, 2015 (now U.S. Pat. No. 10,177,933); and application Ser. No. 14/725,912 filed May 29, 2015 (now U.S. Pat. No. 10,454,783). The disclosures of these applications are incorporated by reference herein in their entirety.

BACKGROUND

This disclosure relates generally to control systems for an automated environment and in particular to coordinated control of an automated environment using multiple resident devices.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc. Users want to control these devices easily and conveniently using mobile devices and the like and to automate their operation.

SUMMARY

At present, it can be difficult for a user to manage multiple electronically controllable devices or systems. For instance, a user's home might have a thermostat, an electronically controllable lighting system, a home security system, and so on. Each such system can be made by a different manufacturer, and each manufacturer may provide a dedicated controller device (e.g., IR-based remote control device) or a controller application program (or "app") that the user can install and run on a general-purpose device such as a smart phone, tablet, or home computer system. Each controller device or controller app is typically customized for a particular manufacturer's systems and may not be interoperable with systems from other manufacturers or even with other systems from the same manufacturer. Such a piecemeal approach is not readily scalable. A user seeking to create a "smart home" environment or the like, with an array of disparate devices that can be centrally controlled or managed, is confronted with the need to accumulate a plethora of controller devices and/or controller apps.

Certain aspects of the present invention can operate in the context of protocols for communication between a controller device (or "controller") and any number of other electronic devices that are to be controlled (referred to herein as "accessory devices" or simply "accessories"). A controller can be implemented, for example, on a general-purpose computing device such as a desktop computer, laptop computer, tablet computer, smart phone, other mobile phone, other handheld or wearable computing device, by providing the general-purpose computing device with appropriate executable program code; alternatively, a controller can be a special-purpose computing device. An accessory can include any device that is controllable by a controller. Examples of accessories include light fixtures, thermostats, door locks, automatic door openers (e.g., garage door opener), still or video cameras, and so on. Accessories and controllers can communicate with each other via wired or wireless channels using standard transport protocols such as Wi-Fi, Bluetooth, Bluetooth LE, or the like. It is to be understood that other communication protocols and transports can be used.

In some embodiments, a "uniform" accessory protocol can be provided via which controllers can send command-and-control messages to the accessory and receive responses from the accessory in a uniform format, regardless of the type or functionality of the accessory. For instance, an accessory can be defined as a collection of services, with each service being defined as a set of characteristics, each of which has a defined value at any given time. These characteristics can represent various aspects of the accessory's state. The protocol can define message formats via which a controller can interrogate (e.g., by reading) and update (e.g., by writing) characteristics of an accessory (singly or in groups), thereby allowing the controller to determine and/or change the accessory's state. Accordingly, any type of accessory, regardless of function, can be controlled in a consistent manner.

In some embodiments, the protocol can define security measures that can be used to prevent unauthorized controllers from operating an accessory. For example, an accessory can be configured to accept requests only from a controller that has previously established a pairing with the accessory and is therefore recognized by the accessory. The protocol can specify the pairing procedures so as to minimize risk of a pairing occurring without approval of the accessory's rightful owner/operator. Further, the protocol can specify end-to-end message encryption such that only the particular controller and accessory can decrypt messages exchanged between them.

A user may desire to automate certain actions of accessories so that the actions are performed automatically in response to the occurrence of a particular event or condition, such as turning on certain lights when the user arrives home or turning off appliances at bedtime. In some embodiments, automation of accessory actions can be achieved by defining triggered action sets (also referred to herein as "triggers"). A triggered action set can be defined, e.g., by specifying to a controller a triggering event (which can be any event that can be detected by a controller) and one or more resulting actions (including one or more operations on accessory devices in the automated environment) to be performed when the controller detects the triggering event. A triggered action set can be executed by a controller, e.g., by detecting occurrence of the triggering event and, in response to detecting the occurrence of the triggering event, sending command-and-control messages to accessories to perform the one or more resulting actions.

In some cases, there may be multiple controller devices associated with a given automated environment. For example, a user may have several personal electronic devices that are capable of operating as controllers, such as a mobile phone, a tablet computer, a laptop or desktop computer, a set-top box that delivers video content to a television (TV) monitor, and so on. Where there are multiple controllers, there is a possibility of controllers sending redundant commands or incompatible commands to accessories. For instance, the same trigger may be defined on multiple controllers, but if multiple controllers execute the trigger, the likely result will be redundant commands to the accessory (or accessories) being acted upon. As another example, users may decide to take different actions at the same time, with the result that conflicting instructions are sent to an accessory.

Accordingly, it may be desirable to provide a "coordinator" device for the automated environment. A coordinator device can be a device that is capable of communicating with accessories and controllers in the context of the automated environment. In embodiments described herein, the coordinator device can be a controller that has added functionality to receive and relay messages (including commands, responses, and notifications) between other controllers and the accessories in the automated environment. Where a coordinator is present, all other controllers can send instructions to the coordinator. The coordinator can resolve any issues of conflicting or redundant instructions before sending commands to accessories. In some embodiments, only a device that is located within the automated environment (i.e., physically present in the environment and connected to a local area network associated with the environment) can act as a coordinator. Any controller device that is capable of operating as a coordinator is referred to herein as being "coordinator-device capable," or "CD-capable." In various embodiments, whether a given controller is CD-capable may depend on the device type (e.g., form factor, hardware, and/or software configuration) and/or user preferences (e.g., a user may be able to indicate via a settings menu whether to make a particular controller CD-capable or not). A CD-capable coordinator can automatically become a "resident device" whenever it is physically present in the automated environment (e.g., when it is connected to a local area network established within the automated environment). In some embodiments, a CD-capable coordinator that becomes resident can declare itself "CD-eligible."

Some automated environments may have multiple controllers that are CD-eligible at any given time; thus, there may be multiple possible coordinators. However, for the same reasons that it is desirable to have a coordinator for the automated environment, it is also desirable to have only one coordinator for the automated environment at any given time.

Certain embodiments of the present invention relate to automated environments with multiple CD-eligible devices. In such an environment, the CD-eligible devices can automatically "elect" one of their number to operate as the coordinator, transparently to any users of the controllers or accessories in the automated environment. In some embodiments, the election can be conducted in two phases: during a first phase, an "interim" coordinator is selected to complete the election process, and during a second phase, the interim coordinator can complete the process by selecting either itself or another eligible device to be the coordinator. The interim coordinator can be selected based on comparing software versions of the CD-eligible devices; in some embodiments, the interim coordinator can be a device that has a most recent version of the software that includes the election logic (the comparison is made among the CD-eligible devices); in the case where two or more devices tie for most recent version of the software, an arbitrary selection between them can be made (e.g., based on which device happens to be first to designate itself as the interim coordinator).

In the second phase of the election process, the interim coordinator can apply a set of priority rules that identify preferred characteristics of a coordinator device. For example, in some embodiments, the priority rules may be based at least in part on hardware profiles of the various CD-eligible devices. One example of a priority rule may favor devices of a type that are relatively unlikely to become non-resident. For instance, a set-top box is likely to be placed by the user in a particular location and left there, while a tablet computer is more likely to leave the environment; thus, a set-top box may be favored over a tablet computer. In some embodiments, certain types of devices (e.g., mobile phones) may be declared CD-ineligible as a matter of policy, e.g., based on the assumed likelihood that such devices will leave the environment frequently. If there are multiple devices of a similar hardware type, a priority rule based on hardware profile may consider hardware version (e.g., prefer newer hardware versions).

Another priority rule can be based on comparing the versions of automated-environment software being run by the resident devices. In some embodiments, software version is considered when two or more resident devices each have the highest-priority hardware profile. In some instances, newer software versions may be preferred over older ones.

Another priority rule can be based on whether a particular resident device can "reach" (i.e., establish a communication channel with) the various accessories in the automated environment. In some embodiments, reachability of accessories is not of critical concern because as long as a first resident device can directly reach a particular accessory, any other resident device can reach that accessory by using the first resident device as a relay. However, where all other considerations are equal (e.g., where two or more resident devices have the same hardware profile and software version), the number of accessories directly reachable by each resident device may operate as a tiebreaker; the resident device that can directly reach the most accessories can be elected coordinator. Additional provisions can be made for the case where reachability results in a tie. For instance, the tie can be broken based on which accessories are directly reachable by each resident device (e.g., the resident device that can reach the front door lock wins). Other tie-breaking logic can also be implemented so that the second phase of the election process reliably results in the election of one device as the coordinator; the elected coordinator can be the interim coordinator or a different device.

The elected coordinator need not be able to directly communicate with every accessory in the automated environment. In some embodiments of the present invention, CD-eligible devices that are not operating as the coordinator and/or other controller devices can dynamically report reachability data to the coordinator. The reachability data can include identifiers of accessories that are reachable directly by the device reporting the data; other information, such as received signal strength information, can also be included. The coordinator can collect reachability data from the CD-eligible devices and can route communications to other CD-eligible devices for delivery to accessories in instances where the coordinator does not have a direct communication path to the accessory.

The following detailed description together with the accompanying drawings will provide a better understanding of the nature and advantages of the present invention.

DETAILED DESCRIPTION

Example Environment

Figure 1:
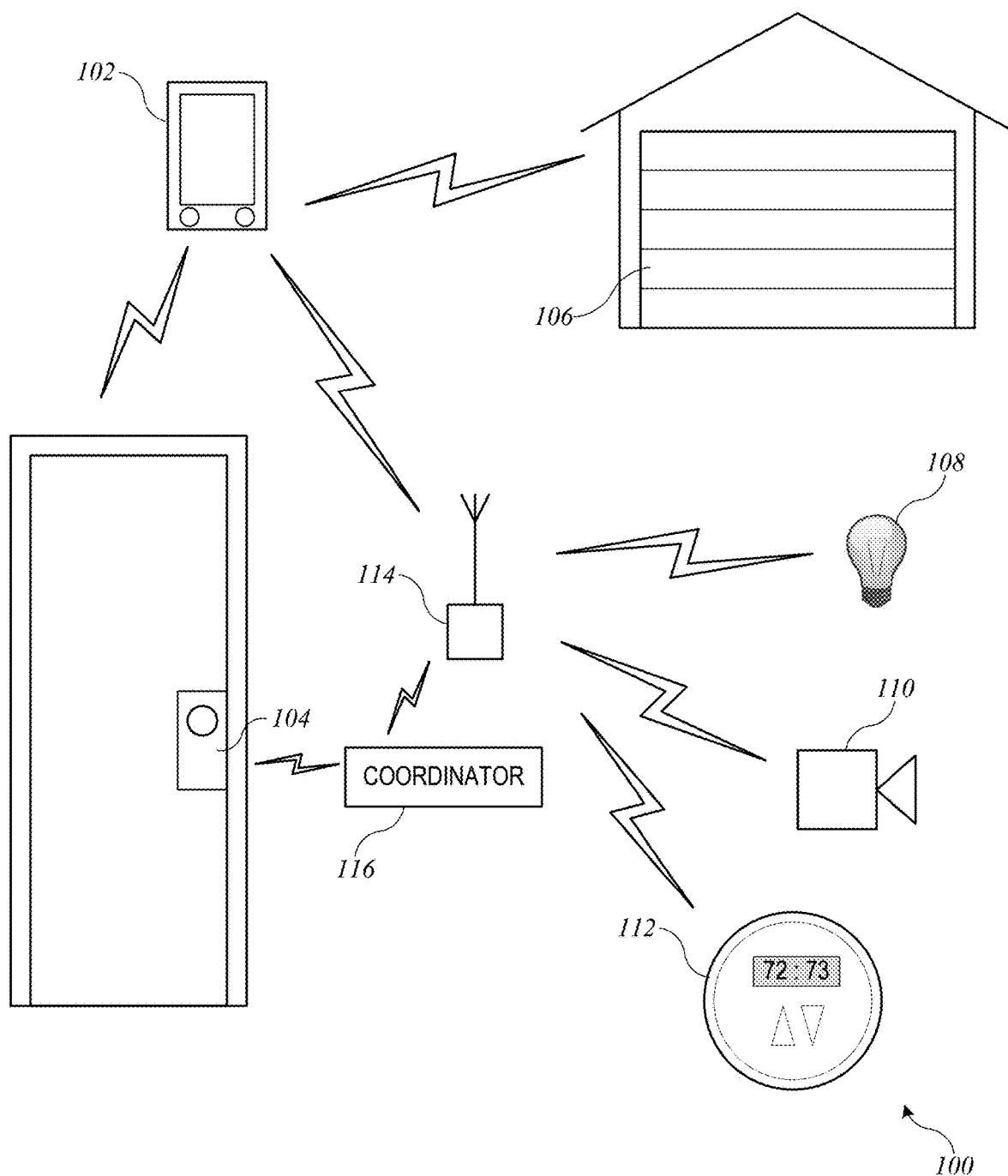
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a resident device, coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless local area network (LAN) provided by access point 114. As noted above, in some embodiments, controller 102 can include a base station, and base station functionality can be integrated into access point 114 or into one of the accessories that is to be controlled (e.g., thermostat 112).

Some embodiments include a coordinator 116. As used herein, coordinator 116 can be any device that is capable of operating as a controller and that is also capable of receiving messages from other controllers and relaying those messages to accessories. Coordinator 116 can implement coordination logic that may alter messages to accessories or decline to relay certain messages to certain accessories. For example, coordinator 116 can include logic to detect and resolve conflicting instructions to accessories. Coordinator 116 may also impose access restrictions, for instance, limiting the ability of a particular controller 102 to access certain accessories (e.g., preventing a controller belonging to a child from changing the settings of thermostat 112). Coordinator 116 can also include logic to perform automated operations on the accessories. For instance, a controller 102 may define a "trigger," which can include a set of operations to be performed on accessories (e.g., turning off light fixture 108, locking door lock 104, closing garage door 106, and setting thermostat 112 to a reduced temperature) and a set of one or more events and/or conditions defining when the set of operations should be performed (e.g., at 10:00 pm every weeknight, or when the user says "Good night, home," or other conditions). In some embodiments, execution of all triggers defined for environment 100 is automatically delegated to coordinator 116.

A particular implementation of environment 100 may have multiple devices that are capable of acting as coordinator 116. Where this is the case, the various devices that are capable of acting as coordinator 116 can implement "election" processes to select exactly one of these devices to act as coordinator 116. Examples of such processes are described below.

Various communication transports and combinations of transports can be used, and different transports can be used with different devices. For example, some wireless transports such as the Bluetooth® Classic or Bluetooth® Smart communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileged can be configured and controlled, for example, using techniques described below, and in above-referenced U.S. application Ser. No. 14/725,891.

In some embodiments, a uniform accessory protocol can facilitate communication by a controller 102 (and/or coordinator 116, which has controller functionality as noted above) with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. In some embodiments, message formats may be transport-dependent while conforming to the same accessory model. Examples of an accessory model based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
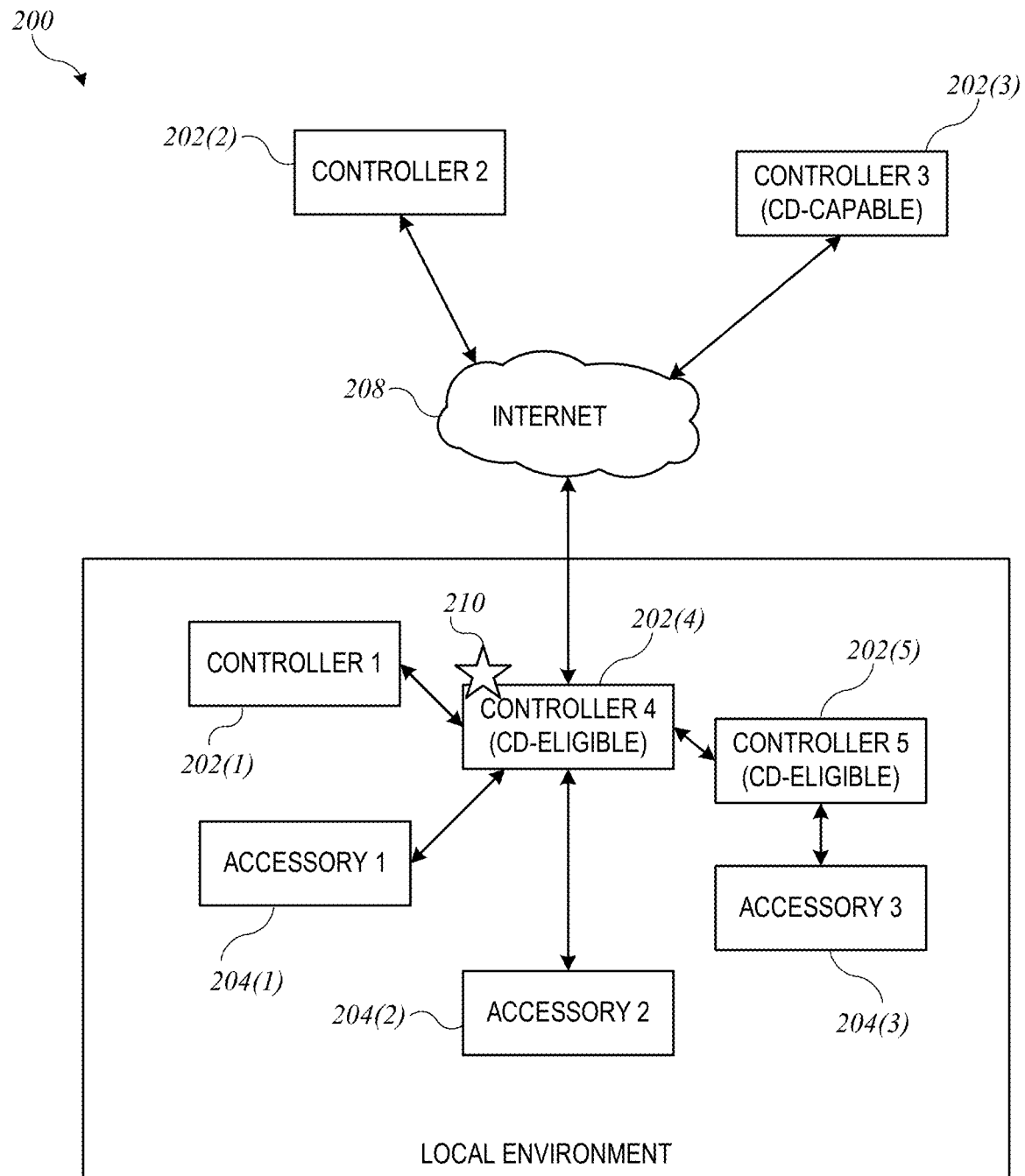
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment). Each controller 202 can be an electronic device owned and/or operated by a user who frequents environment 206 (e.g., a resident of the home or a regular visitor to the home). Controllers 202 can each be similar to controller 102 or coordinator 116 of FIG. 1, and accessories 204 can be similar to various accessories shown in FIG. 1.

In configuration 200, it is in principle possible for any controller 202 to communicate with any accessory 204, either directly or through an intermediary. For example, controller 202(1) can communicate with accessories 204(1) and 204(2) via controller 202(4), and controller 202(1) can communicate with accessory 204(3) via controllers 202(4) and 202(5).

As noted above, it may be desirable to designate a single coordinator device (or "coordinator") that can be located with local environment 206. In the configuration shown, controller 202(4) has been designated as the coordinator, as indicated by star 210. It is to be understood that the designation of a particular controller as coordinator 210 is dynamic and may apply to different controllers at different times. In some embodiments, the designation of coordinator 210 is managed such that there is not more than one coordinator 210 at any given time and such that there is nearly always a device designated as coordinator 210; exceptions can occur on a transient basis when an "incumbent" coordinator becomes unavailable and other eligible controllers conduct an election to replace the unavailable coordinator. (It should be understood that there may not be a coordinator available if none of the active controllers are currently eligible to act as coordinator 210. In that case, environment 206 can be operated without a coordinator; for instance, controllers can communicate directly with accessories.)

As used herein, the "coordinator" designation can be applied to an electronic device that is capable of operating as a controller of accessories 204 as well as relaying messages from other controllers (e.g., controllers 202) to accessories 204. In some embodiments, the coordinator can be an "intelligent" device that can coordinate operations among multiple controllers and/or accessories and is not limited to passively relaying messages. Any controller device can act as a coordinator, provided that the device is capable of presenting itself as a controller to accessories 204 and is capable of communicating securely with controllers 202. In some embodiments, the coordinator can present itself to accessories 204 as a controller and to controllers 202 as an accessory that provides services for communicating with other accessories (e.g., accessories 204); examples are described in above-referenced U.S. application Ser. No. 14/725,891.

In some embodiments, coordinator 210 can be a device that is expected to remain resident in local environment 206 and that is expected to be powered on and available for communication most or all the time. (It is to be understood that a coordinator can occasionally become unavailable, e.g., in connection with software or firmware upgrades, power outages, or other intermittent occurrences.) For example, the coordinator can be a desktop computer, a Wi-Fi or access-point unit, a dedicated accessory-control base station, a set-top box for a television or other appliance (which can implement coordinator functionality in addition to interacting with the television or other appliance), or any other electronic device as desired. Other embodiments may allow other types of devices, including devices such as laptop computers or tablet computers that may leave the environment from time to time, to operate as coordinator 210, at least during times when they are resident in local environment 206. As described below, multiple controllers may meet the qualifications for acting as the coordinator, in which case an election process can be performed to elect one of the qualified controllers as coordinator 210

In some embodiments, controllers 202 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1), 202(4), and 202(5) are currently located in local environment 206 with accessories 204 and coordinator 210. For example, controller 202(1) can be on the same LAN as accessories 204 and coordinator 210. Controllers 202(2) and 202(3) are currently located outside local environment 206 but are connected to a communication network 208 (e.g., the Internet); such controllers are said to be "remote" from accessories 204 and coordinator 210. It is to be understood that controllers 202 can be mobile devices that are sometimes within local environment 206 and sometimes outside local environment 206. Accessories 204 need not be mobile and need not be connected to communication network 208. In some embodiments, one or more controllers in local environment 206 (e.g., controller 202(4)) can be connected to communication network 208 and can facilitate access to accessories 204 by remote controllers 202(2) and 202(3).

In the example shown, controllers 202 can communicate with accessories 204 via controller 202(4), and controller 202(4) can be said to act as a "proxy" for accessories 204. Controller 202(4) can communicate directly with accessories 204(1) and 204(2). In some cases, controller 202(4) (or other controllers) can communicate with an accessory via a "bridge." As used herein, a "proxy" can be any device operable to relay commands between a controller and an accessory (or between a controller and another proxy). A "bridge" is a type of proxy that can also translate between different communication protocols used by the controller and the accessory. Further, in some embodiments, a type of bridge referred to as a "tunnel" can provide secure end-to-end communication between a controller and an accessory. Examples of proxies, bridges, and tunnels are described in above-referenced U.S. application Ser. No. 14/725,891. As described below, coordinator 210 can find paths to accessories either directly or through another coordinator-capable controller 202 that can act as a proxy (e.g., bridge or tunnel); thus, it is not required that coordinator 210 be able to communicate directly with every accessory 204 in local environment 206.

In network configuration 200, controllers 202 can be configured to communicate with accessories 204 via coordinator 210 (i.e., whichever controller 202 is currently designated as the coordinator) whenever possible. Thus, as shown, controller 202(1), which is in local environment 206, communicates with coordinator 210 rather than directly with accessories 204, as do remotely located controllers 202(2)

and 202(3). Direct communication between non-coordinator controllers 202 and accessories 204 can be limited, e.g., to situations where coordinator 210 is not available. In other embodiments, controllers 202 may communicate directly with accessories 204 whenever they happen to be in range of each other (e.g., on the same Wi-Fi network or within Bluetooth range). For instance, as shown, controller 202(4) can communicate directly with accessory 204(2).

In some embodiments, coordinator 210 can be used to coordinate access by multiple controllers 202 to multiple accessories 204. For example, rather than establishing a pairing between each controller 202 and each accessory 204, controllers 202 can each establish a pairing with coordinator 210 and coordinator 210 can establish a pairing with each accessory 204. The same pair setup and/or pair add processes used to establish a controller-accessory pairing can also be used to establish a controller-coordinator pairing, with the coordinator acting in the role of accessory. For purposes of coordinator-accessory pairing, the coordinator can assume the role of controller. Thus, coordinator 210 can present itself as an accessory when communicating with a controller (e.g., any of controllers 202) and as a controller when communicating with an accessory (e.g., accessory 204).

Coordinator 210 can facilitate operation of an accessory network including accessories 204. For example, coordinator 210 can coordinate maintenance of "environment descriptor data" defining an environment model (also referred to as "home data") for the accessory network and can provide the model (or portions thereof) to various controllers 202. Examples of an environment model are described below. Controllers 202 can use the environment model to dynamically generate user interfaces for their users and can operate accessories 204 by interacting with coordinator 210, e.g., in response to user input. In some embodiments the environment descriptor data can be stored and synchronized at a cloud service that is accessible to all controllers 202. A variety of techniques can be used to manage the environment descriptor data, or environment model.

In some embodiments, coordinator 210 can manage permissions associated with the accessory network or environment model to limit access by specific controllers 202 to some or all accessories 204. In some embodiments, controllers 202 can preferentially route all requests to accessories 204 through coordinator 210 and in some embodiments, some or all of accessories 204 can be configured to communicate directly only with coordinator 210 and to ignore requests that come directly from controllers 202. This can allow coordinator 210 to enforce permissions and other restrictions on access to accessories 204.

It should be noted that in configuration 200, it is possible that one or more of the controllers (e.g., controller 202(1)) can be permitted to communicate with one or more accessories (e.g., accessory 204(1)) indirectly (via coordinator 210) but not directly, regardless of whether controller 202(1) is in local environment 206. This might occur, for instance, if controller 202(1) has established a pairing with coordinator 210 but not directly with accessory 204(1). In some instances, this can provide enhanced security; for instance, an accessory that has a pairing established with coordinator 210 can refuse to establish any other pairings. However, there may be cases where direct access is desirable, and establishing a direct pairing between a certain accessory, e.g., accessory 204(1) and one or more controllers 202 can be permitted. For example, suppose that accessory 204(1) is a door lock and controller 202(1) is a mobile phone. If a direct pairing between accessory 204(1) and controller 202(1) is established, a user can use controller 202(1) to lock or unlock accessory 204(1) via direct communication, thereby locking or unlocking the door. This can be useful, e.g., in the event that controller 202(4) is temporarily unavailable. In some embodiments, controller 202(4) can be used to indicate to accessory 204(1) which of controllers 202 are authorized for direct access, and accessory 204(1) can establish pairings with authorized controllers 202. In some embodiments, accessory 204(1) can be configured to accept direct communication from an authorized controller 202 only when coordinator 210 is not available. Thus, the general rule can be that all communications with accessory 204 go through coordinator 210, with exceptions made on a per-accessory and per-controller basis. In situations where no coordinator 210 has been designated, all controllers may be permitted to communicate with all accessories directly or via non-coordinator proxies.

The designated coordinator 210 can operate as an intelligent agent for allowing controllers to operate accessories, rather than simply relaying messages. For example, coordinator 210 can establish a pairing with each of controllers 202 and a pairing with each accessory 204. When controller 202(1), for example, receives a user request to interact with a specific accessory, e.g., accessory 204(1), controller 202(1) can establish a first pair-verified session with coordinator 210 and provide its instructions for accessory 204(1) to coordinator 210 via the first pair-verified session. Coordinator 210 can receive the instructions, establish a second pair-verified session with accessory 204(1) and send appropriate control messages to accessory 204(1) via the second pair-verified session. In some embodiments, coordinator 210 can be privy to the content of the instructions, and in some embodiments, the messages sent to accessory 204(1) need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204(1) to coordinator 210. Coordinator 210 can analyze the received instructions, e.g., to detect and resolve conflicts such as where controller 202(1) instructs coordinator 210 to turn accessory 204(1) on while controller 202(2) instructs coordinator 210 to turn accessory 204(1) off. Coordinator 210 can be programmed with priority rules or other rules for resolving conflicts (e.g., "on" takes priority over "off"; instructions from a controller with admin privilege take precedence over instructions from a controller without admin privilege; etc.). Coordinator 210 can apply the priority rules to resolve any conflicts and can communicate instructions to accessory 204(1) based on the resolution. When a response is received from accessory 204(1), coordinator 210 can determine whether to send a corresponding message (or a different message) to controller 202(1) and/or to controller 202(2). As another example, coordinator 210 can enforce permissions established for various controllers 202 and/or accessories 204. For example, when one of controllers 202 sends a request, coordinator 210 can apply decision logic to determine whether the controller 202 that sent the request has appropriate permission; if not, coordinator 210 can reject the request. The decision logic can be as simple or complex as desired; for instance, a controller belonging to a child may be limited as to which hours of the day or for how long it can operate a particular accessory (e.g., a TV) while a parent's controller can have unlimited access, or a controller associated with a guest (e.g., a babysitter) may be restricted to operating a certain subset of the accessories. Thus, coordinator 210 is not limited to acting as a passive relay for messages between controllers and accessories but can actively intervene to resolve conflicting instructions, enforce any limitations that may exist on the privileges or permissions granted to particular controllers or users, and so on.

It will be appreciated that network configuration 200 is illustrative and that variations and modifications are possible. Any number of controllers and any number of accessories can be included in a network configuration. Some or all of accessories 204 may be accessible only within the local environment. Further=, different controllers 202 may have different levels of permission in regard to accessing accessories 204; for instance, remote access via network 208 may be permitted for some controllers 202 but not for other controllers 202.

As noted above, designating a coordinator can be particularly useful in the context of an automated environment with a number of accessories that can be controlled. Examples include homes, cars or other vehicles, office buildings, campuses having multiple buildings, etc. For purposes of illustration, an example of an accessory network implementation for a home will be described; those skilled in the art with access to the present disclosure will understand that similar accessory networks can be implemented in other automated environments.

In one example of an accessory network, each accessory has an established pairing with one or more controllers, and accessories can be controlled by sending messages, e.g., as described in above-referenced U.S. application Ser. No. 14/725,912 and U.S. application Ser. No. 14/614,914. This can be perfectly serviceable for small networks with just a few accessories. However, in some instances, particularly as the number of accessories increases, it can be helpful to establish meaningful (to a user) groups of accessories that can be managed in a coordinated fashion. Accordingly, certain embodiments of the present invention incorporate environment models usable to coordinate control across multiple accessories in an accessory network.

As used herein, an environment model can provide various logical groupings of the accessories in an environment. For example, a home environment can be modeled by defining "rooms" that can represent rooms in the home (e.g., kitchen, living room, master bedroom, etc.). In some cases, a room in the model need not correspond to a room in the home; for instance, there can be a "front yard" room or an "anywhere" room (which can be used to refer to accessories that are present in the home but whose location within the home is subject to change or has not been defined as a room). Each accessory in the home can be assigned to a room in the environment model, e.g., based on the actual physical location of the accessory. Rooms can be grouped into zones based on physical and/or logical similarities. For instance, an environment model for a two-level house might have an "upstairs" zone and a "downstairs" zone. As another example, an environment model might have a "bedrooms" zone that includes all bedrooms regardless of where they are located. The model can be as simple or complex as desired, e.g., depending on the size and complexity of the environment.

Where an environment model is defined, accessories represented in the environment model can be controlled individually or at the level of rooms, zones, or the whole model. For instance, a user can instruct a controller or coordinator to turn on all the outside lights or to turn off all accessories in a specific room.

Other groupings of accessories can also be defined. For example, in some embodiments, a user can augment an environment model by grouping various accessories into "service groups" that can include any set of accessories the user may desire to control together, at least some of the time. A service group can include accessories in any combination of rooms or zones, and the accessories in a service group can be homogeneous (e.g., all upstairs lights) or heterogeneous (e.g., a light, a fan, and a TV). In some embodiments, a user can provide a single instruction to a controller to set the state of an entire service group (e.g., turn the group on or off). While not required, the use of service groups can provide another degree of flexibility in coordinating control over multiple accessories.

The environment model can be represented using a data structure (also referred to herein as "environment descriptor data"). The environment descriptor data can include a descriptor of the environment (e.g., rooms, zones, etc. that have been defined); identifiers and long-term public keys of accessories that have been added to the environment (and assignments of accessories to rooms); definitions of triggered action sets, or triggers, that may have been created by various controllers; identifiers of authorized users and/or their controller devices; as well as additional information pertaining to identification and selection of a coordinator, examples of which are described below. Environment descriptor data can be shared among controllers using a cloud-based data storage and synchronization service. The environment descriptor data can be stored in the cloud in encrypted form and decrypted by the various controllers using keys locally stored thereon. Accordingly, all controllers associated with the automated environment can operate from a shared environment model.

Additional examples related to defining, sharing, and using an environment model are described in above-referenced U.S. application Ser. No. 14/725,912. It is to be understood that an environment model is not required to make use of at least some of the features described below.

Environment Descriptor Data

In some embodiments of the present invention, the environment descriptor data can include data usable to facilitate dynamically and automatically "electing" one of the controller devices associated with the environment model to be the designated coordinator for the environment.

Figure 3:
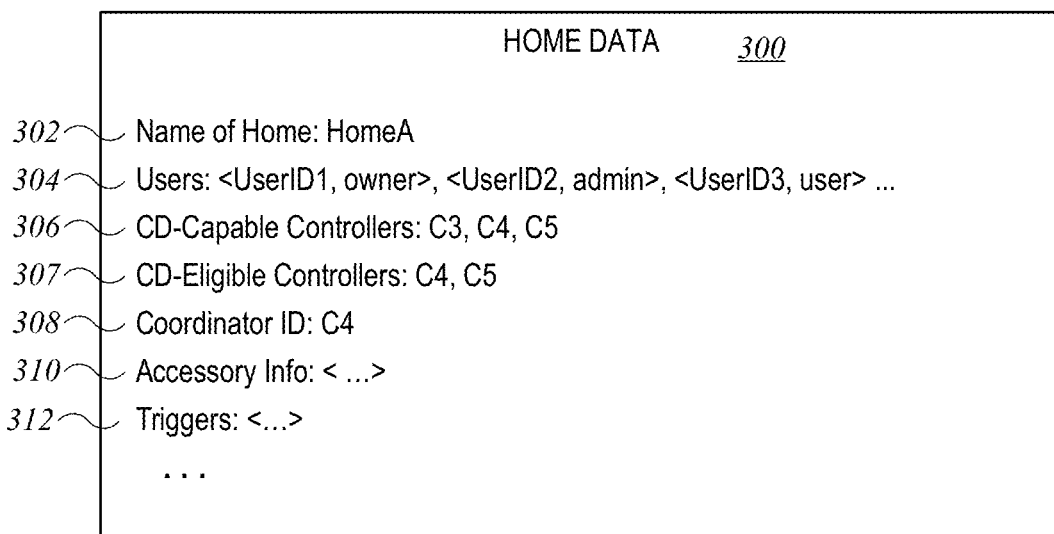
FIG. 3 shows a simplified example of environment descriptor data according to an embodiment of the present invention.

FIG. 3 shows a simplified example of environment descriptor data 300 according to an embodiment of the present invention. Environment descriptor data 300 includes a name 302 ("HomeA") assigned to the environment to which the data pertains; this name can be assigned, e.g., when a user first creates the environment model and becomes the designated "owner" of the environment model. In some embodiments, the name can be changed later by an owner. The name can be useful in instances where a controller is associated with multiple environments (e.g., a user may have a primary residence and a secondary residence, or the user may have automated environments at home and at work). Environment descriptor data 300 can also include a list 304 of user identifiers and associated permission levels for each user who is authorized to operate controllers in the automated environment. In some embodiments, users can be identified by reference to their accounts at a cloud-based data management service (e.g., the iCloud® service of Apple Inc.). Permission levels for various can be defined as desired. For example, "owner" permission can be initially assigned to the user who created the environment; owner permission may be the highest level of permission, allowing any type of modification to the environment model (the owner may or may not be able to reassign owner permission, depending on implementation). "Admin" permission can be granted by the owner (or another admin) to one or more other users, allowing those users to make at least some types of changes to the environment model; "user" permission can be granted by the owner or an admin to users who should be allowed to access the environment model but have limited or no ability to modify it. Other permission levels can be defined.

Environment descriptor data 300 can also include a list 306 of identifiers of specific controllers associated with the environment that are "CD-capable." As used herein, "CD-capable" denotes a controller that has the ability to act as a coordinator at least some of the time (e.g., when it is resident in the environment) and does not necessarily mean that the controller actually does or will act as a coordinator. (In FIG. 2, controllers 202(3), 202(4), and 202(5) are all CD-capable.)

In some embodiments, any controller can be CD-capable. In other embodiments, it may be desirable to impose further requirements for establishing a particular controller as CD-capable. For example, some embodiments provide that only controllers registered to a user with owner (or admin) permission for the environment can be CD-capable; controllers registered to other users are not CD-capable. In addition or instead, restrictions can be based on device type. For example, it may be desirable to require that the coordinator be "resident" (i.e., physically present) in the environment for which it is the coordinator. Controller devices that are likely to be frequently absent from the environment, such as mobile phones or wearable devices, may not be desirable as coordinators, and such devices can be designated as non-CD-capable. On the other hand, a controller device such as a set-top box or desktop computer, which is not likely to leave the environment where it is installed, can be CD-capable. In some instances, a user may be able to select whether a particular controller device is CD-capable or not, e.g., via a settings menu provided by the controller device. For example, some users of tablet or laptop computers tend to leave them at home most of the time and may choose to designate them as CD-capable, while other users, who tend to take these devices with them, may choose to designate them as non-CD-capable. Another requirement can be based on software version (e.g., a version of an environment-control software program that enables a device to operate as a controller); for instance, a controller that does not have a software version that includes program code implementing coordinator functions should be designated as non-CD-capable.

In some embodiments, any controller that meets minimum requirements of hardware profile, software version, and being registered to a user with appropriate permissions can be designated as CD-capable. This can be a relatively static designation, and it may or may not always be possible for a CD-capable device to serve as coordinator. Accordingly, in some embodiments, a CD-capable controller may be able to designate itself as either "CD-eligible" or "CD-ineligible" depending on its current circumstances. For instance, environment descriptor data 300 can also include a list 307 of identifiers of specific controllers associated with the environment that have designated themselves as CD-eligible; controllers not on list 307 can be considered CD-ineligible.

In some embodiments, each CD-capable controller can determine whether and when to designate itself as CD-eligible. For instance, referring to FIG. 2, if it is desirable that coordinator 210 be physically present in the local environment with the accessories to be controlled, a controller such as controller 202(3) that is not physically present in local environment 206 can designate itself CD-ineligible. As another example, a controller that is operating on battery power may designate itself CD-ineligible if its power reserve drops below a threshold level, regardless of where it is. As yet another example, a user may be able to select whether a particular controller device should be CD-eligible or not, e.g., via a settings menu provided by the controller device, and a controller device can suggest to the user that the user should make another controller device (or itself) CD-eligible. Depending on implementation, CD-capable controllers can designate themselves as CD-eligible or CD-ineligible as their status changes (e.g., when the controller enters or leaves the local environment) or when an election for a coordinator is called; elections are described below. Thus, the set of CD-eligible controllers can be understood as a subset consisting of some or all of the CD-capable controllers.

In some embodiments, one controller cannot designate another as CD-eligible but can suggest that the other controller designate itself as CD-eligible. In some embodiments, one controller can designate another as CD-ineligible. This may be desirable, for instance, if one controller is running an older version ("version A") of environment-control software that has a bug that was fixed in a later version ("version B"). The nature of the bug may make it undesirable for a coordinator to be running software version A, and software version B can include an instruction indicating that controllers running software version A should be designated as CD-ineligible. A controller running software version B can execute this instruction and designate all controllers running version A as CD-ineligible.

Any number of CD-capable and/or CD-eligible controllers can be associated with an environment; however, as noted above, it is desirable to have only one coordinator at any given time. Accordingly, at any given time, one of the CD-eligible controllers can be designated as the coordinator, and environment descriptor data 300 can include an identifier 308 of the currently designated coordinator (e.g., coordinator 210 of FIG. 2). In circumstances where no coordinator is designated, identifier 308 can store a null value. Examples of techniques for designating a coordinator are described below.

In operation, when any controller (e.g., controller 202(1)) of FIG. 2) prepares to communicate with an accessory, the controller can read coordinator identifier 308 to determine whether a coordinator is currently designated. If a coordinator is designated, then the controller can direct the communication to the designated coordinator. If no coordinator is designated, the controller can attempt to communicate directly with the accessory.

Environment descriptor data 300 can also store other information useful for interacting with the environment to which it pertains. Examples include accessory information 310 (which can include, e.g., accessory identifiers, public keys, and/or descriptors of accessory services and characteristics) and trigger information 312 (which can include information defining automated processes to be executed by the designated coordinator or by other controllers). It is to be understood that any information useful for interacting with the environment can be included in environment descriptor data 300.

As noted above, environment descriptor data 300 can be synchronized across the various controllers associated with the environment, e.g., via a cloud-based service and/or other synchronization techniques. Accordingly, all controllers can maintain an up-to-date, mutually consistent version of environment descriptor data 300.

Example Election Process

According to some embodiments of the present invention, the coordinator device for an automated environment can be selected dynamically using an "election" process that is transparent to users of the automated environment. In some embodiments, an election process can be initiated by any CD-eligible device (which can be, for instance, any CD-capable device that is connected to the LAN associated with the automated environment). For example, an election process can be initiated if a CD-eligible device determines that there is no "incumbent" coordinator (which can be the case, e.g., if coordinator indicator 308 is set to a null value or if the coordinator identified by coordinator indicator 308 is not present on the LAN). In some embodiments, a CD-eligible or CD-capable controller device can initiate an election when it becomes connected to the LAN (also referred to as becoming "resident" in the local environment). The election process results in the selection of one of the CD-eligible devices as the coordinator.

Elections can be initiated by one or more devices under various circumstances, such as when an "incumbent" coordinator leaves the environment or when a new CD-capable controller becomes resident in the environment. Specific examples of conditions for initiating elections are described below. It is assumed that CD-capable devices (or at least the CD-eligible devices) are notified when an election is initiated so that they can participate in the election. In some embodiments, the election process can include determining which controllers are currently CD-eligible.

In some embodiments, an election process can include two phases. During a first phase, an "interim" coordinator is elected from among the CD-eligible controller devices, and during a second phase, the interim coordinator can determine whether to remain as coordinator or to replace itself with a different coordinator chosen from among the CD-eligible controller devices.

Figure 4:
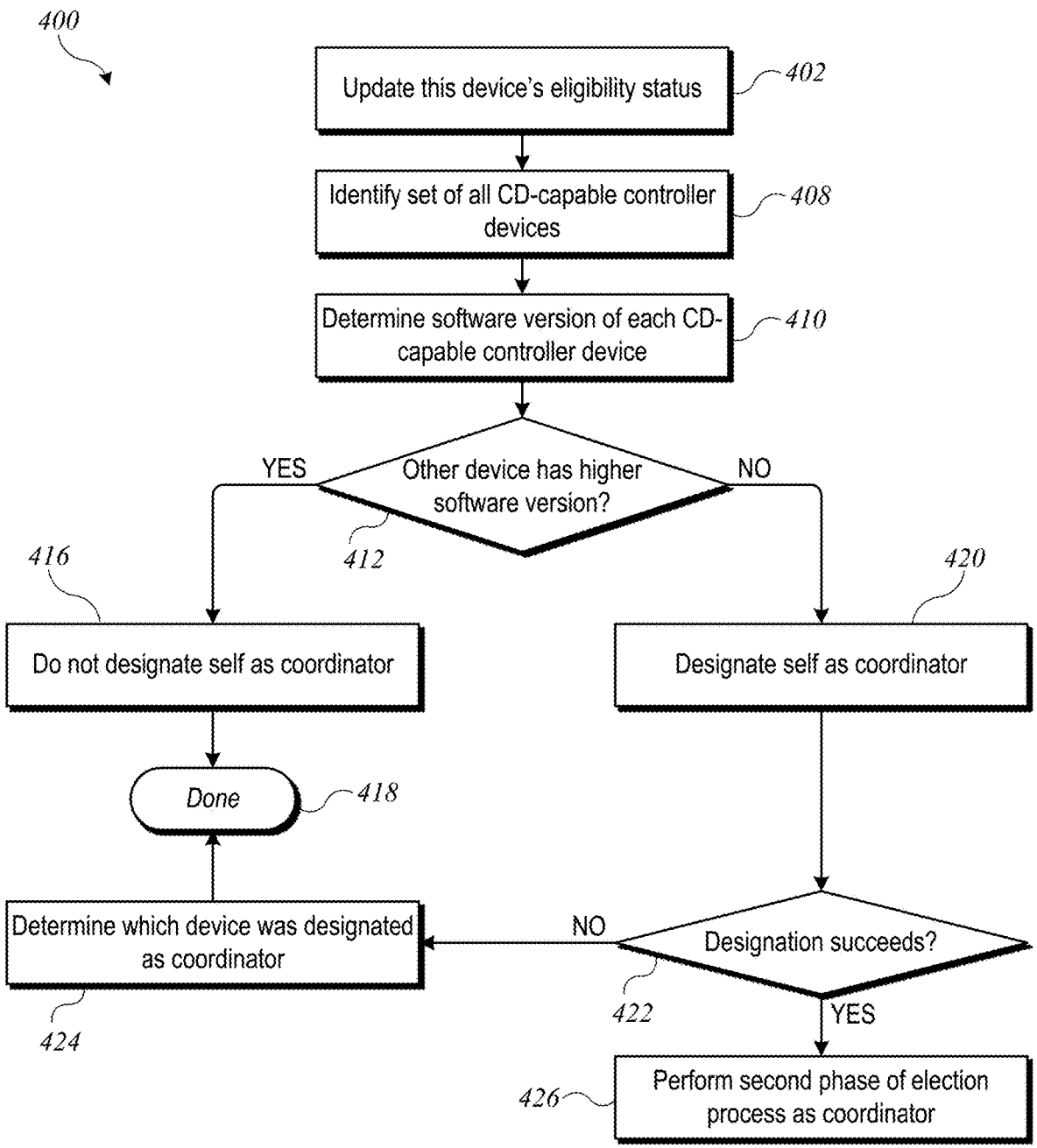
FIG. 4 shows a flow diagram of a process that can be used in a first phase of an election process according to an embodiment of the present invention.

FIG. 4 shows a flow diagram of a process 400 that can be used in the first phase of an election process according to an embodiment of the present invention. Process 400 can be performed concurrently by each CD-capable device whenever an election is initiated. During process 400, each CD-capable device can independently determine whether it should designate itself as coordinator on an interim basis for purposes of conducting the second phase of the election process; process 400 can incorporate an arbitration policy (or other conflict resolution mechanism) such that, even if multiple devices determine that they should designate themselves as interim coordinator, only one device is actually so designated.

Process 400 can begin when a CD-capable device receives a notification that an election has been initiated, e.g., under any of the circumstances described herein as resulting in initiation of an election. At block 402, the CD-capable device can update its own eligibility status, e.g., its designation as CD-eligible or CD-ineligible. For example, as noted above, a CD-capable device might declare itself CD-eligible or CD-ineligible at various times based on its location, power reserve, and/or other factors that may or may not be variable for a particular CD-capable device. In some embodiments, updating the eligibility status can include updating list 307 of FIG. 3 and/or sending a notification to other CD-capable devices indicating whether this device is or is not CD-eligible. In some embodiments, if a device executing process 400 determines that it is not CD-eligible, it can exit process 400 at this point. In other embodiments, a device that is CD-capable can become coordinator for long enough to complete the election process (even if it is currently CD-ineligible), and process 400 can include all CD-capable devices.

At block 408, the device executing process 400 can identify a set of CD-capable controller devices associated with the environment. For example, the device can read list 307 of FIG. 3 from a central repository, or the device can exchange status messages with other CD-capable devices associated with the environment (which may be also executing process 400 concurrently in response to being notified of an election). Various techniques can be used to allow each CD-capable device to communicate its status to other CD-capable devices. In an alternative embodiment, the set of CD-capable devices at block 408 can be limited to CD-eligible devices.

At block 410, the device executing process 400 can determine the software version of each CD-capable controller device in the set identified at block 408 (including itself). A device can determine its own software version based on internally stored data. Software versions for other devices can be determined, e.g., from information stored in environment descriptor data 300, from information provided with an eligibility status message at block 408, or by querying the other devices.

At block 412, the device executing process 400 can determine whether any other CD-capable device has a higher (more recent) software version than this device. The "software version" can be a version of a software program or program component that includes code implementing the election logic. It is assumed that the logic for electing a coordinator, in particular the logic for the second phase of the election process, may evolve over time, with later software versions having more sophisticated election logic. Accordingly, it is assumed to be desirable to have the second phase of the election process conducted by the device with the highest (most recent) software version available within the set of CD-capable devices. If, at block 412, the device executing process 400 determines that another CD-capable device has a higher software version, then at block 416, the device executing process 400 does not attempt to designate itself as the coordinator, and process 400 can end at block 418. The device need not perform further election logic, although (as will become apparent) a device that exits the election process at block 418 can end up being elected as the coordinator. In some embodiments, block 416 can also include send a message to the other device (or devices) identified as having the highest software version to notify the other device that an election is in progress; if a device that receives such a notification is not already executing process 400, the notification can trigger the device to initiate process 400.

If, at block 412, the device executing process 400 determines that no other CD-capable device has a higher software version, then at block 420, the device executing process 400 can attempt to designate itself as the coordinator, e.g., by updating coordinator field 308 in the data structure of FIG. 3, which is assumed to be shared among all coordinator devices associated with the environment. It should be noted that two or more CD-capable devices concurrently executing process 400 may reach block 420 at approximately the same time. In embodiments described herein, it is assumed that if two (or more) coordinators concurrently attempt to update coordinator field 308, the first update request to be processed will succeed and the remaining update requests will be rejected as operating on outdated data. Accordingly, at block 422, the device executing process 400 can determine whether its attempt to designate itself as coordinator succeeded. If not, then at block 424, the device can determine which device was designated as the coordinator (e.g., by reading the updated coordinator field 308), and process 400 can end at block 418. This designation can be regarded as an interim designation that may be changed as a result of performing the second phase of the election, e.g., as described below.

If, at block 422, the device's attempt to designate itself as coordinator succeeded, then at block 426, the device can assume the role of coordinator and conduct the second phase of the election process. In cases where two or more devices attempt to designate themselves as coordinator at block 420, each such device has the same software version and therefore the same decision logic for conducting the second phase of the election, so the outcome of the second phase should not depend on which of the two or more devices assumes the role of coordinator at block 426. While conducting the second phase of the election process, the device can operate as a coordinator in all respects, including receiving and routing requests from controllers to accessories and vice versa.

Figure 5:
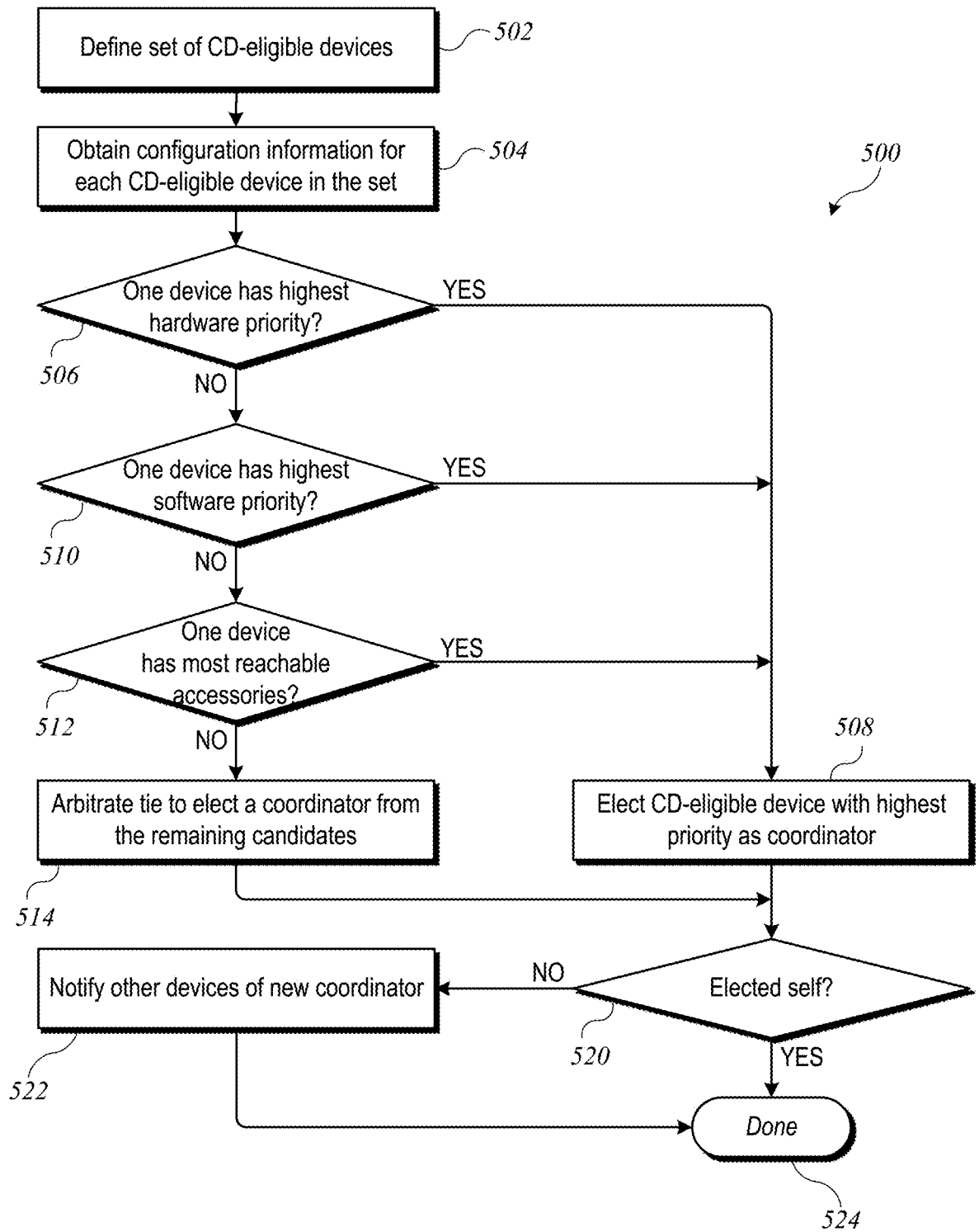
FIG. 5 shows a flow diagram of a process that can be used in a second phase of an election process according to an embodiment of the present invention.

FIG. 5 shows a flow diagram of a process 500 that can be used in the second phase of an election process according to an embodiment of the present invention. Process 500 can be performed by the "interim" coordinator device that was selected as a result of the first phase (e.g., the result of execution of process 400 by the CD-capable devices associated with the environment). During process 500, the interim coordinator can apply a sequence of priority rules to determine which device, among a current set of CD-eligible devices, has the highest priority ranking. The device with the highest priority ranking (which might or might not be the interim coordinator) is elected coordinator and can remain in that role (also referred to as being an "incumbent" coordinator) until it resigns or a new election is held.

At block 502, the interim coordinator can define the set of CD-eligible devices that will be considered as candidates during the second phase of the election. In some embodiments, all CD-capable controllers can be treated as eligible unless they opted out (e.g., by updating their eligibility status to CD-ineligible at block 402 of process 400). In some embodiments, the interim coordinator can communicate with each CD-capable controller to confirm whether it should or should not be included in the CD-eligible set. In some embodiments, a controller that declares itself CD-eligible may be "overruled" by the interim coordinator. For instance, the version of the software executed by the interim coordinator may specify a minimum software version for CD-eligibility, and if a controller that has designated itself as CD-eligible does not have at least the minimum software version, the interim coordinator can declare that controller CD-ineligible. As yet another example, it may be desirable to prune list 307 of CD-eligible controllers, e.g., by removing any listed controller that has been offline for an extended period of time (e.g., four weeks, two months, etc.).

At block 504, the interim coordinator can obtain configuration information for each CD-eligible device in the set defined at block 502, e.g., by requesting and receiving a configuration report from each device. The interim coordinator (assuming it is still CD-eligible) can also obtain its own configuration information. In some embodiments, the configuration report from a particular device can include a hardware profile, a software profile, and a reachability profile. A "hardware profile" can include information such as the device type (e.g., laptop computer, tablet computer, set-top box, etc.), device manufacturer and model, date of manufacture (or a hardware revision number or code assigned during manufacture), information about specific hardware components (e.g., processor type and/or speed, available memory, power source and power reserve level, etc.), and the like. A "software profile" can include information such as operating system and version installed on the device, a version identifier for the environment management software installed on the device, and/or version information for other software components or programs that may affect communication, power management, or other factors relevant to a device's performance as a coordinator. A "reachability profile" can include information about the ability of a particular controller to communicate directly with various accessories in the environment. For example, a controller can generate a reachability profile by attempting to establish a direct communication path (e.g., using the LAN or Bluetooth communication channels) to each of the accessories associated with the environment and recording the results. Various information can be included; for instance, the reachability profile may indicate the number of accessories for which the attempt succeeded (globally or per-communication channel) and/or identifiers of particular accessories that could be directly reached.

Once the configuration information has been obtained, the interim coordinator can apply priority rules to complete the election process. In process 500, the priority rules are based on hardware profiles first, then software profiles, then reachability profiles; however, this is just an example, and other sets of priority rules can be used.

At block 506, the interim controller can determine whether one of the CD-eligible devices has a higher hardware priority than any other CD-eligible device. In some embodiments, a priority ranking can be associated with each hardware profile (e.g., by the developer of the software implementing process 500), and the specific rankings can be based on considerations such as reliability, stability, power source and power consumption, and the like.

To further illustrate the concept of hardware priority ranking, consider an example where the CD-capable hardware configurations include tablet computers and set-top boxes. It may be expected that a set-top box would be more likely than a tablet to remain resident across a significant period of time (days or weeks), and therefore hardware profiles where the device type corresponds to "set-top box" may receive higher priority rankings than hardware profiles where the device type corresponds to "tablet computer." Within the device type of set-top boxes, rankings can be assigned based on the hardware revision number, e.g., so that newer versions of the set-top box hardware receive higher priority rankings than older versions. Other considerations may also apply; for example, an older tablet computer that is plugged into an external power source may receive a higher priority ranking than a newer tablet computer that is drawing operating power from an internal battery.

If, at block 506, the interim coordinator determines that one device in the set of CD-eligible devices has a higher hardware priority than any other device in the set of CD-eligible devices, then at block 508, the CD-eligible device with the highest hardware priority can be selected as the coordinator. For instance, in the specific ranking example given above, if there are two CD-eligible devices and one is a tablet computer while the other is a set-top box, then the set-top box has the highest priority ranking and wins the election. As another example, again using the rankings given above, if there are two set-top boxes, the set-top box with the newer hardware has higher hardware priority ranking and wins the election. The election can then be concluded, as described below.

It is possible that, at block 506, there is not just one device with highest hardware priority. This would be the case if two or more devices in the set of CD-eligible devices are in a "tie" for highest hardware priority. Where there is a tie for highest hardware priority, further priority rules can be applied to break the tie. Thus, the election process can continue, but with only the two or more devices that tied for highest hardware priority remaining as candidates. For example, at block 510, the interim controller can determine whether one of the remaining candidate devices has a higher software priority than any other remaining candidate device. In some embodiments, a priority ranking can be associated with each software profile (e.g., by the developer of the software implementing process 500), and the specific rankings can be based on considerations such as stability, security, and the like. In a typical example, newer versions of software are likely to be more stable and secure, and accordingly newer versions of software can be awarded higher priority rankings. It should be noted that the priority rankings can be based on versions of multiple different software components. For example, the priority rankings may provide that devices running the same version of the environment management software can be assigned different priority rankings based on which version of an operating system they are running.

If, at block 510, the interim coordinator determines that one of the remaining candidate devices has a higher software priority than any other remaining candidate device, then at block 508, the candidate device with the highest software priority can be elected as the coordinator. For instance, according to one set of priority rules, if there are two candidate devices that have the same (highest) hardware priority, and if one device is running a newer version of the environment management software than the other, then the device with the newer software version would have higher software priority. The election can then be concluded, as described below.

It is possible that, at block 510, there is not just one device with highest software priority. This would be the case if two or more of the candidate devices (i.e., devices that tied for highest hardware priority at block 506) are also tied for highest software priority. Where this is the case, then the election can continue, with only the two or more devices that tied for highest software priority remaining as candidates.

For example, at block 512, the interim controller can determine, based on the reachability profiles, whether one of the remaining candidate devices has a larger number of reachable accessories than any other. If one such candidate device can be identified, then that candidate can be elected as coordinator at block 508, and the election can be concluded as described below.

If block 512 does not result in the election of a single candidate, additional arbitration logic for breaking ties can be invoked at block 514. This logic can include any information about the remaining candidate devices that is available to the interim coordinator. For example, a candidate device that is operating from an unlimited power source (e.g., plugged into a wall outlet) may be preferred over a candidate device that is operating on battery power. Additionally or instead, resource use or availability on the candidate devices can be compared, including but not limited to CPU use, networking load, presence or absence of wireless peripherals that may preclude or reduce the ability to communicate directly with accessories, and so on. Current resource usage levels and/or historical patterns can be compared, and devices that are less heavily loaded may be preferred over devices that are more heavily loaded. Other considerations can be based on residency factors, such as the length of time a given candidate device has been continuously resident in the environment (favoring longer continuous residency), fraction of the time the device has been resident over the last month or other time period (favoring devices that are more frequently present), average duration of a period of residence (favoring devices that do not leave frequently), etc. In some embodiments, the tie-breaker of last resort can be an arbitrary selection among the remaining candidates, and the interim coordinator can preferentially select itself if it remains a candidate at block 514. Any decision procedure can be used as long as the procedure results in election of exactly one of the candidate devices as coordinator.

Once a coordinator has been elected (via block 508 or block 514 as the case may be), the election can be concluded. At block 520, the interim coordinator (the device executing process 500) can determine whether it or another device was elected. If another device was elected, then at block 522, the interim coordinator can notify other controllers (including but not limited to CD-eligible coordinators) of the new coordinator, e.g., by updating coordinator field 308 in FIG. 3. If the interim coordinator elected itself, then an update to coordinator field 308 is not needed, and process 500 can end at block 524. In some embodiments, the interim coordinator may send direct notifications to one or more other CD-eligible devices indicating that the election is complete and optionally indicating the outcome.

It will be appreciated that election processes 400 and 500 are illustrative and that variations and modifications are possible. Operations described sequentially can be performed in parallel, operations described separately can be combined, and the order of operations can be modified to the extent that operational dependencies do not require a particular order. The election of an interim coordinator can be performed among all CD-capable devices (as described above), or limited to CD-eligible devices as desired. In the second phase of the election, the particular number and sequence of priority rules applied can be varied, as can the content of the rules at each stage. Priority rules can be based on hardware characteristics, software characteristics, connectivity (e.g., reachability of particular accessories), device-specific behavior or movement patterns (e.g., how frequently a particular device leaves the environment, with priority given to devices that leave less frequently), power considerations (e.g., whether a particular device is operating on battery power or power from a wall outlet or the like, with priority given to devices operating on "wall" power), load-balancing considerations (e.g., giving priority to a device that has the most resources to spare), and/or any other information that can be compared among CD-eligible devices.

In some embodiments, more complex priority rules may be provided. For instance, for purposes of defining priority rules, a certain software update or version may be designated as a "critical" update due to the nature of the changes involved (e.g., significant improvements to security and/or reliability). In some embodiments, the first priority rule may be based on whether the software version includes the latest critical updates, and any devices whose software version does not include the critical updates would be dropped out of the election (e.g., by being declared CD-ineligible or by application of a priority rule). Among CD-eligible devices whose software version includes the critical updates, the election can proceed with rules based on hardware priority ranking, then software priority ranking as described above. Thus, for example, in the case where the CD-eligible devices are a set-top box and a tablet computer, a hardware priority rule might normally favor the set-top box, but if only the tablet computer has the critical update, the tablet computer can be elected; if, on the other hand, both the tablet computer and the set-top box have the critical update, then the set-top box can be elected based on hardware priority (even if the tablet computer has a newer software version). Other priority rules and combinations of rules can also be implemented.

As another example, in some embodiments, sequentially applied priority rules can be replaced or supplemented by a formula that computes a score or set of scores for each candidate device. The scoring formula can combine different aspects of device capability or performance (e.g., hardware profile in combination with power source, software profile in combination with resource load, and any other combinations). Selection of a coordinator can be based on comparing the scores or sets of scores for different CD-eligible devices.

Once a particular device becomes the interim or elected coordinator (e.g., as a result of election processes 400 and/or 500), that device can begin to operate as the coordinator. For example, all other controllers (including the other resident devices) may begin to send their instructions to accessories to the coordinator rather than directly to the accessories (or to a previously designated coordinator). In addition, the coordinator may assume responsibility for executing any triggers that have been defined for the automated environment. For instance, the coordinator can read trigger definitions 312 from environment descriptor data 300 and can begin executing the defined triggers. Thus, although various qualifiers such as "interim" and "incumbent" may be used herein when referring to a coordinator in relation to an election, such qualifiers have no significance in regard to the coordinator's interaction with other controllers and accessories; an interim coordinator that is conducting an election process can operate as a coordinator. Some embodiments may allow a device that is CD-capable but not currently CD-eligible to operate as interim coordinator (e.g., for the duration of executing process 500).

It should be noted that a change of coordinators may not be entirely seamless. For example, during periods of time when there is no designated coordinator, controllers may need to delay communications with accessories pending the election of a new coordinator, or the controllers may attempt to communicate with accessories via alternative pathways (e.g., direct communication). Accordingly, in the two-stage process described above, if an election is initiated at a time when there is a designated coordinator that is reachable on the LAN (also referred to herein as an "incumbent" coordinator), the incumbent coordinator can continue to operate as the coordinator while the first phase of the election is in progress. Once the first phase ends, the interim coordinator can begin operating as the coordinator (if the incumbent coordinator wins election as the interim coordinator, it continues operating as the coordinator) while the second phase of the election is performed. If the interim coordinator does not win the election, the transition to a new coordinator can occur with minimal delay to other controllers.

Embodiments described above require that the coordinator be a resident device (i.e., a device that is physically present in the local environment). This may be preferred on the assumption that physical presence in the local environment will facilitate communication between the coordinator and the accessories (e.g., making the communication faster and/or more reliable). However, it is to be understood that a residence requirement is not necessary; some embodiments may permit CD-capable devices that are not currently resident to be declared CD-eligible, provided that the nonresident CD-capable devices are able to communicate with the accessories (e.g., via a message relay service or by routing messages through another device that is physically present in the local environment).

Initiation of Election

As noted above, elections using processes 400 and/or 500 can be initiated under various circumstances. Examples will now be described.

Figure 6:
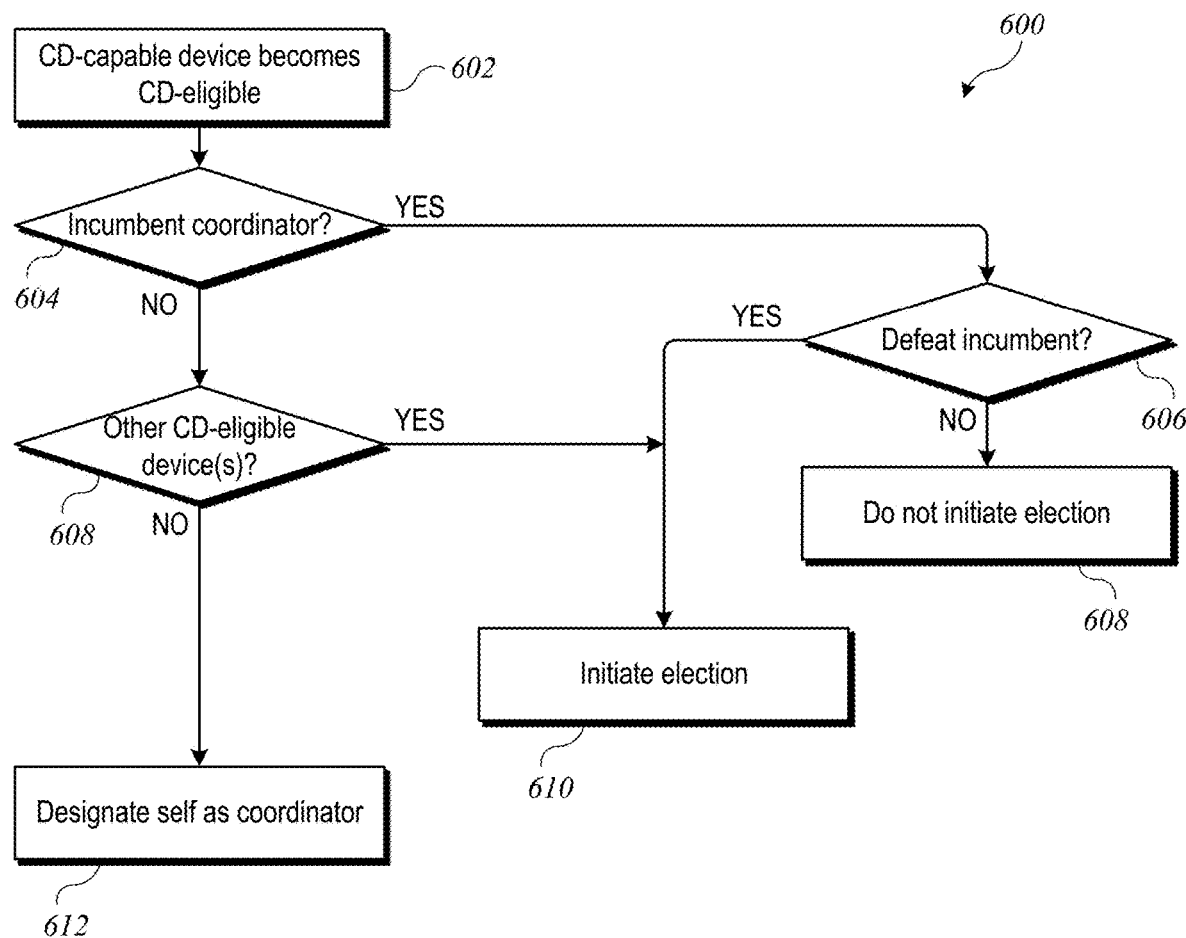
FIG. 6 shows a flow diagram of a process for initiating election of a coordinator according to an embodiment of the present invention.

One circumstance under which an election may be initiated is when a new CD-capable device becomes CD-eligible (e.g., when the new device becomes resident in the local environment). FIG. 6 shows a flow diagram of a process 600 for initiating election of a coordinator according to an embodiment of the present invention. Process 600 can be performed by any resident device associated with a particular environment.

Process 600 can begin at block 602, when a CD-capable device becomes CD-eligible. For example, a device that is capable of determining its location may detect that it has entered a geofence associated with the automated environment, or the device may detect that it is now connected to LAN associated with the automated environment. For example, CD-capable controller 202(5) of FIG. 2 may be a tablet device that the user brings home that automatically detects and joins the user's home Wi-Fi network, or it may be a newly installed device such as a new set-top box.

At block 604, the device executing process 600 can determine whether there is an "incumbent" coordinator (e.g., as a result of a previous election). For instance, the newly resident device can read coordinator identifier 308 from environment descriptor data 300, then verify that the identified coordinator is present on the LAN. If there is an incumbent coordinator, then at block 606, the device executing process 600 can make a preliminary determination as to whether it can defeat the incumbent coordinator in a hypothetical election. For instance, the newly resident device may apply some or all the priority rules of process 500 (but without changing the coordinator designation). If the device executing process 600 determines that it would not defeat the incumbent coordinator, it can terminate process 600 at block 608 without initiating an election. If, however, the newly resident device determines that it would win, then it can initiate an election at block 610. For example, if the incumbent controller is a set-top box and the priority rules favor a set-top box over a tablet computer, then a tablet computer that becomes resident may determine not to initiate an election, but under the same priority rules, if the incumbent controller is a tablet computer, then a set-top box that becomes resident may initiate an election. In some embodiments, the election initiated at block 610 can be a "targeted" election in which only the incumbent controller and the newly resident device participate as candidates.

In some embodiments, a CD-capable device that becomes CD-eligible might not initiate an election if there is an incumbent coordinator; it can simply wait for the incumbent coordinator to become unavailable or for some other condition that may result in initiating an election. This can avoid any disruption in normal operation associated with a transition between coordinators; the tradeoff is that the incumbent coordinator might be a less-than-optimal choice.

If, at block 604, there is no incumbent coordinator (e.g., if coordinator identifier 308 has a null value or if the coordinator identified by identifier 308 is not present on the LAN), then at block 612, the device executing process 600 can determine whether any other CD-eligible devices are present. For example, the device executing process 600 can read environment descriptor data 300 (FIG. 3), which identifies all identify all CD-capable and/or CD-eligible controller devices associated with the environment. The device executing process 600 can determine which (if any) of these CD-capable devices are currently CD-eligible (e.g., which devices are visible on the LAN associated with the environment). For example, referring to FIG. 2, controller 202(5) can determine that controllers 202(4) and 202(3) are CD-capable but that only controller 202(4) is currently CD-eligible (because controller 202(3) is not physically present).

If no other CD-eligible devices are present, then at block 612, the device executing process 600 can designate itself as a coordinator, e.g., by updating coordinator identifier 308 in environment descriptor data 300. If at least one other CD-eligible device is present, then the device executing process 600 can initiate an election at block 610. For example, the device executing process 600 can send a message to each other CD-eligible (or CD-capable) device indicating that it should initiate an election process. In some embodiments, an abbreviated election process can be used at block 610. For instance, as noted above, if there is an incumbent coordinator, the election can be a "targeted" election between the incumbent coordinator and the newly eligible device. As another example, if the device executing process 600 can determine that no other resident device has a higher software version, it can execute process 500 without first designating itself as interim coordinator. In some embodiments, the election initiated at block 610 can be a "targeted" election in which only the incumbent controller and the newly resident device participate as candidates.

Another circumstance that may result in initiating an election occurs when the incumbent coordinator becomes unavailable. For example, the coordinator device may be removed from the local environment, powered down, or disassociated from the user account (e.g., if the user logs out of a shared device). To avoid prolonged periods of coordinator unavailability, CD-eligible (or CD-capable) devices that are not the coordinator can actively monitor the status of the incumbent coordinator and can initiate an election if the incumbent coordinator becomes unavailable for a sufficiently long time.

Figure 7:
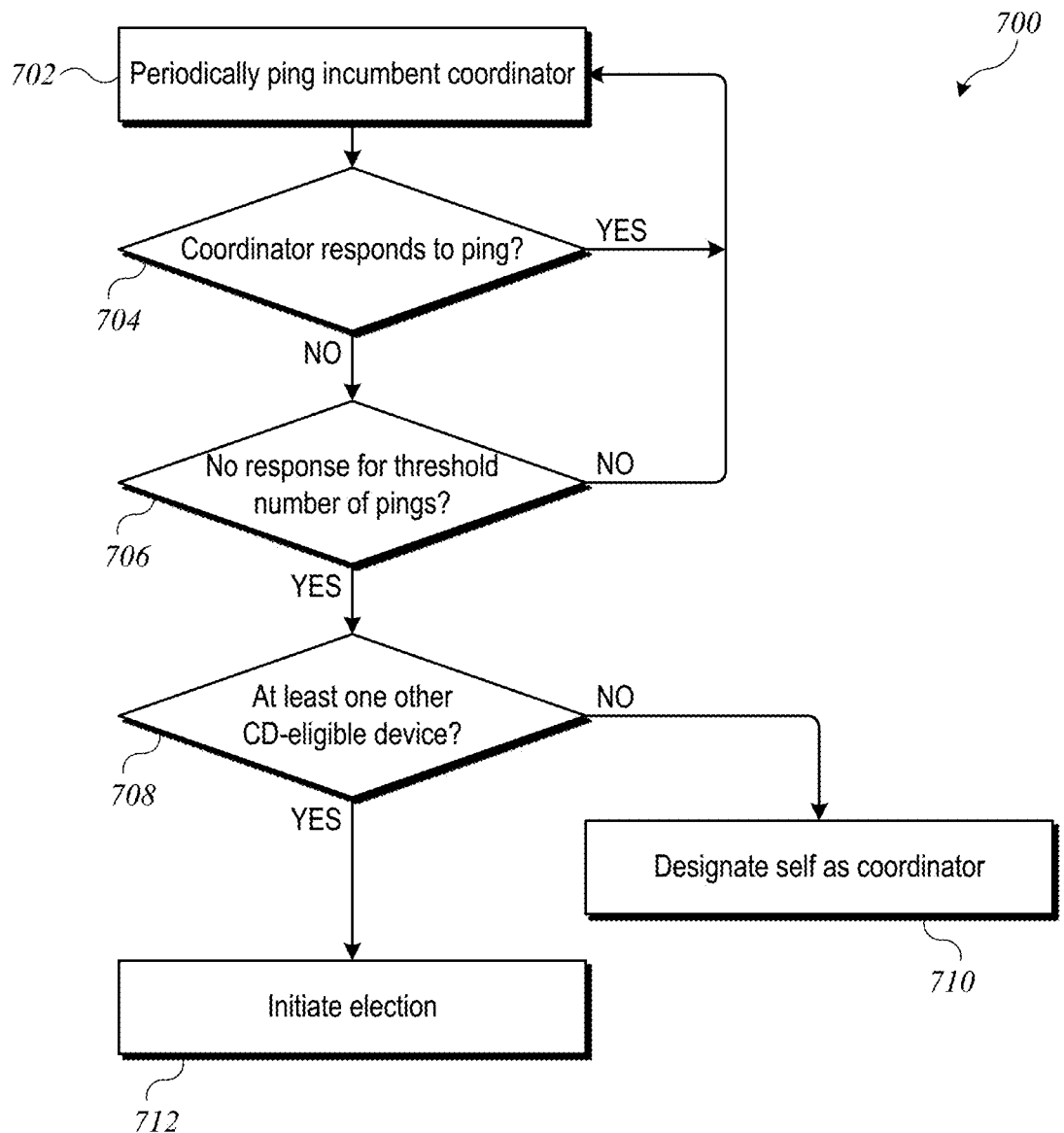
FIG. 7 shows a flow diagram of a process for monitoring an incumbent coordinator according to an embodiment of the present invention.

FIG. 7 shows a flow diagram of a process 700 for monitoring an incumbent coordinator according to an embodiment of the present invention. Process 700 can be performed by any device that is not the incumbent coordinator (e.g., by controller 202(5) in FIG. 2); in some embodiments, the CD-capable or CD-eligible devices perform process 700. If there are multiple devices that are not the incumbent coordinator, each such device can independently perform process 700.

At block 702, the device executing process 700 can periodically ping the incumbent coordinator to make sure the coordinator is still present on the LAN. The "ping" can include any communication operation that entails receiving a response from the coordinator on the LAN. If, at block 704, the incumbent coordinator responds to the ping, the device executing process 700 can continue pinging (e.g., at regular intervals such as every 60 seconds, every 5 minutes, every 10 minutes, etc.). The particular ping interval can be dynamically optimized based on characteristics of the pinging device (e.g., power status, whether the pinging device is local or remote) and/or characteristics of the incumbent coordinator. If the incumbent coordinator does not respond (e.g., within 10 seconds or some other response time), then at block 706, the device can determine (e.g., via continued pinging at a higher rate) whether the coordinator has remained unresponsive for a threshold number of consecutive ping cycles. The threshold can be, e.g., one ping cycle, five ping cycles, ten ping cycles, If the coordinator remains unresponsive for the threshold number of consecutive ping cycles, then at block 708, the device executing process 700 can determine whether at least one other CD-eligible device is available. If not, then the device executing process 700 is the only CD-eligible device, and it can designate itself as the coordinator at block 710. If at least one other CD-eligible device is available, then at block 712, the device executing process 700 can initiate an election to select a new coordinator, e.g., as described above with reference to FIG. 6. The election can proceed according to processes 400 and 500 or other similar process. In some embodiments, conducting the election can include making a final attempt to communicate with the incumbent coordinator (e.g., at block 502 of process 500); if the attempt succeeds, the incumbent coordinator can be considered as a candidate.

Process 700 can continue indefinitely and can be executed in the background on each CD-capable (or CD-eligible) device that is not the incumbent coordinator. Different devices executing process 700 can have different ping rates and different timeout intervals (e.g., a device operating on battery power may ping less frequently to conserve power). Once one device determines that the incumbent coordinator is unresponsive, an election is initiated, and all CD-capable (or CD-eligible) devices can discontinue process 700 and participate in the election.

In some embodiments, if an incumbent coordinator becomes unresponsive, the user may be notified. For instance, some controllers may be able to display a user interface that presents status information about the automated environment, and this status information can be updated to indicate that the coordinator is offline. This can allow the user to investigate and correct a problem (if indeed a problem exists).

In some embodiments, an incumbent coordinator may actively resign its role in favor of another device. For example, depending on implementation, a device that is portable (such as a tablet computer) may be CD-eligible and may become the coordinator. If the user removes the portable device from the local environment, it may be desirable for the portable device to resign as coordinator in favor of a device that is still resident in the local environment. As another example, a coordinator device may operate on battery power. If a coordinator operating on battery power determines that its power reserve has dropped below a threshold level (which can be device-dependent), the coordinator may resign its role in order to conserve its remaining power and/or to provide a smoother transition to a different coordinator device. Other circumstances may also arise in which an incumbent coordinator determines that another device might be better suited to operate as coordinator. When such circumstances arise, the incumbent may resign, which can result in a new election.

Various resignation processes can be implemented. In one process, the resigning coordinator can send a message to one or more other CD-eligible controllers indicating that the resigning coordinator is changing its status to CD-ineligible. This can result in the other CD-eligible controllers conducting an election (e.g., using process 400 and 500) without the participation of the resigning coordinator. For instance, the resigning coordinator can refuse to designate itself as interim coordinator in process 400, and if the resigning coordinator is prompted at block 502 to declare itself CD-eligible, it can decline to do so, which can ensure that the resigning coordinator will not be elected. In another resignation process, the resigning coordinator can perform a process similar to process 400 to determine whether it or another device should conduct the election for its replacement. If the result is that the resigning coordinator should conduct the election, the resigning coordinator can perform a process similar to process 500 but excluding itself from the set of CD-eligible devices (which ensures that the resigning coordinator will not be elected). If the result is that another device should conduct the election, then the resigning coordinator can notify the other device that an election should be initiated; as in other examples, the resigning coordinator can decline to participate in the ensuing election. Other implementations are also possible.

Example Pathfinding for a Coordinator

It is not required that a coordinator be able to communicate directly with every accessory associated with the environment. In some cases, such a requirement may be impractical. For example, some accessories may communicate exclusively using short-range channels such as Bluetooth LE; in a large home, it may not be possible to position a single coordinator device such that it is within signaling range of every Bluetooth-using accessory in the home. Instead, as described above with reference to FIG. 2, a coordinator can have an indirect path to some or all of the accessories.

Figure 8:
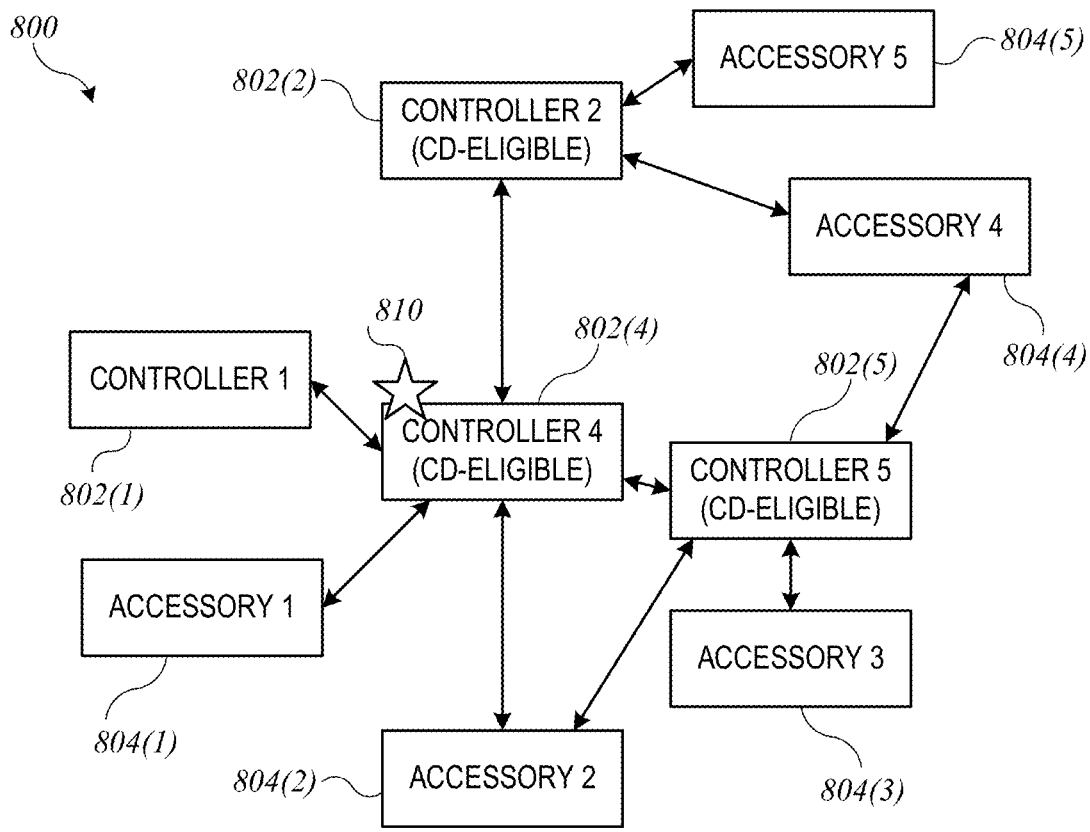
FIG. 8 shows a local environment according to an embodiment of the present invention.

FIG. 8 shows a local environment 800 according to an embodiment of the present invention. Local environment 800 can be generally similar to local environment 206 of FIG. 2 and can include controllers 802 (which can be similar or identical to controllers 202) that communicate with accessories 804 (which can be similar or identical to accessories 204). In this example, only local devices are shown; it is to be understood that remote controllers may also participate.

Controller 802(4) is the designated coordinator (as indicated by star 810) for local environment 800, e.g., as a result of election processes described above, and coordinators 802(2) and 802(5) are other CD-eligible devices. Different controllers 802 have direct communication paths to different subsets of accessories 804 (arrows indicate the communication paths). For example, controller 802(4) has direct communication paths to accessories 804(1), 804(2), and 804(4); controller 802(2) has direct communication paths to accessories 804(4) and 804(5); and controller 802(5) has direct communication paths to accessories 804(2), 804(3), and 804(4). The direct communication paths can be point-to-point paths such as Bluetooth communication channels.

Although FIG. 8 does not show an example of an accessory that has a direct path to every one of CD-eligible controllers 802(2), 802(4), 802(5), it is to be understood that such accessories can exist. For example, an accessory that supports Wi-Fi communication can join a Wi-Fi network with controllers 802(2), 802(4), and 802(5), allowing any of these controllers to address communications to the Wi-Fi-enabled accessory.

In this example, it is assumed that controllers 802 route all of their communication with accessories to controller 802(4) in its role as coordinator 810. In order to facilitate communication between controllers 802 and all of accessories 804, coordinator 810 can maintain reachability information, e.g., in the form of a lookup table indicating which CD-eligible controllers can reach each accessory. For example, coordinator 810 can obtain, from each CD-eligible controller, a list of accessories that are directly reachable from that controller. The various CD-eligible controllers 802 can provide updated reachability data to coordinator 810. For example, in response to determining that controller 802(4) has been elected as coordinator 810, CD-eligible controllers 802(2) and 802(5) can each send a message containing a list of directly reachable accessories to controller 802(4). Controller 802(4) can also generate its own list of directly reachable accessories.

Figure 9:
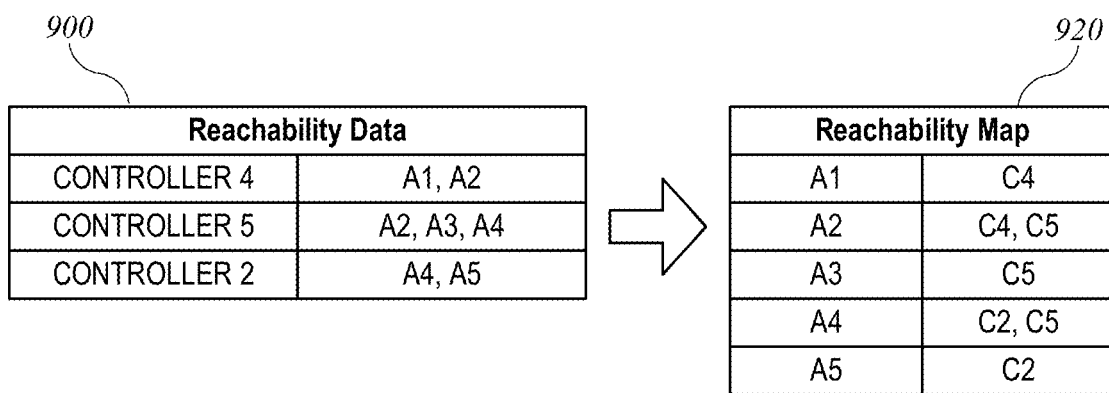
FIG. 9 shows a table of reachability data that can be obtained from controllers of FIG. 8 according to an embodiment of the present invention.

FIG. 9 shows a table 900 of reachability data that can be obtained from controllers of FIG. 8 according to an embodiment of the present invention. Controllers 802 can update reachability table 900, e.g., by sending updates to coordinator 810 as accessories become reachable or unreachable. Table 900 can be converted by coordinator 810 into reachability map 920, which can be a lookup table organized by accessory. Table 900 can be kept up to date based on updates received from controllers 802. When coordinator 810 receives a request to access a particular accessory, coordinator 810 can consult reachability map 920 and select a path.

Table 900 and reachability map 920 can be constructed and updated on the basis of reachability data sent to coordinator 810 by other controllers, and the information contained in table 900 and reachability map 920 does not need to be propagated by coordinator 810 to other devices. This can reduce network traffic associated with maintaining the connectivity data. In some embodiments, table 900 can be initialized when a new coordinator (e.g., coordinator 810) is elected (e.g., as a result of processes 400 and 500 described above). The new coordinator 810 can request reachability data from some or all of other controllers 802, and each controller 802 can respond to the request either by sending reachability data or by sending an opt-out message indicating that the controller is not participating in message routing. After responding to the initial request, each controller 802 can send updated reachability data to coordinator 810 as changes occur. A controller 802 that initially opts out can opt in later, e.g., by sending reachability data to coordinator 810, and a controller 802 that initially opts in (e.g., by sending reachability data) can opt out later, e.g., by sending an opt-out message to coordinator 810. Thus, individual controllers can dynamically opt in or out of the routing network. For instance, a controller implemented in a mobile phone may opt in when the mobile phone enters the local environment and opt out when the mobile phone leaves.

Figure 10:
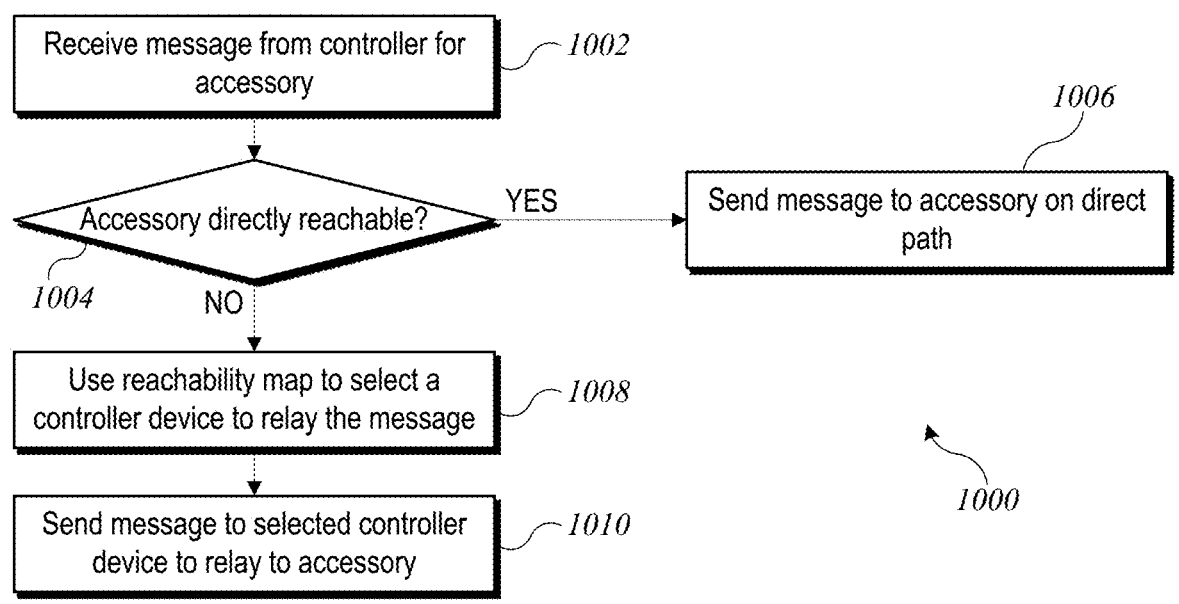
FIG. 10 is a flow diagram of a process for path selection according to an embodiment of the present invention.

FIG. 10 is a flow diagram of a process 1000 for path selection according to an embodiment of the present invention. Process 1000 can be implemented, e.g., in coordinator 810 or any other device that is acting as a coordinator or as a relay for another controller.

Process 1000 can begin at block 1002, when coordinator 810 receives a message from a controller (e.g., controller 802(1)) for delivery to an accessory (e.g., any one of accessories 804). In some embodiments, coordinator 810 may forward the message as received and need not be privy to its content. In other embodiments, coordinator 810 may operate in an intelligent mode (as described above), in which case coordinator 810 can read the message content and determine an appropriate message to deliver to the accessory. Block 1002 can include any processing operations related to identifying the destination accessory and/or determining content of a message to be delivered to the destination accessory.

At block 1004, coordinator 810 can determine whether the destination accessory is directly reachable. For instance, coordinator 810 can consult reachability data 900 or reachability map 920 to determine whether there is currently a direct path between controller 802(4) (which is operating as coordinator 810) and the destination accessory. In this example, a direct path exists from controller 802(4) to accessories 804(1) and 804(2) but not to other accessories. At block 1006, if the destination accessory is directly reachable, coordinator 810 can send the message to the destination accessory on the direct path.

If, at block 1004, the destination accessory is not directly reachable, then at block 1008, coordinator 810 can use reachability map 920 (or other reachability data) to select a controller device to relay the message. In some instances, there may be only one controller device that has a direct path to the destination accessory; for example, in FIGS. 8 and 9, only controller 804(5) has a direct path to accessory 804(3). Where this is the case, then the one controller with a direct path can be selected. In some instances, however, multiple controllers may have a direct path to the destination accessory; for example, in FIGS. 8 and 9, controllers 802(2) and 802(5) both have direct paths to accessory 804(4). Where this is the case, coordinator 810 can apply arbitration logic to select a path. For instance, in some embodiments, the reachability data reported by controllers can include a signal strength indication for each reachable accessory, and the controller that reports the strongest signal can be selected. Other considerations can include, for example, resource use or availability at various controllers (e.g., if controller 802(2) is a set-top box that is being used to stream a movie at high resolution, it may be desirable to route the message on a different path).

At block 1010, coordinator 810 can send the message to the selected controller (e.g., controller 802(5) for destination accessory 804(3)), and the selected controller 802(5) can relay the message to the destination accessory. In this case, controller 802(5) can operate as a passive relay that forwards messages as received. In some embodiments, controller 802(5) may operate as a bridge that can reformat the message for compatibility with another transport without reading the message content; for instance, controller 802(4) may communicate with controller 802(5) using a Wi-Fi network, while controller 802(5) communicates with destination accessory 804(3) using Bluetooth communication.

It is to be understood that the pathfinding configurations and processes are illustrative and that modifications are possible. The particular arrangement and connectivity of controllers and accessories can be varied as desired, and different accessories (or controllers) can use different transports. In some embodiments, any controller, not just controllers that are CD-eligible, can report its reachability data to the coordinator, and the coordinator can route messages to accessories through any controller that can reach the accessory. It should be understood that any controller other than the coordinator can opt out of participation in routing, e.g., by not sending reachability data to the coordinator. In some embodiments, some paths may include dedicated proxies (e.g., bridges or tunnels) that may not be CD-eligible. Further, in some embodiments, it may be possible to map multi-hop paths to an accessory. In addition, there may be instances where the controller that is the instigator of a message (e.g., controller 802(1) in the example described above) does not have a direct communication path to coordinator 810. Where this is the case, controller 802(1) can route the message through an indirect path, which in some cases may include one or more other controllers capable of relaying messages (e.g., controllers 802(2) or 802(5)).

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator (including any CD-capable device) or proxy as described above.

Figure 11:
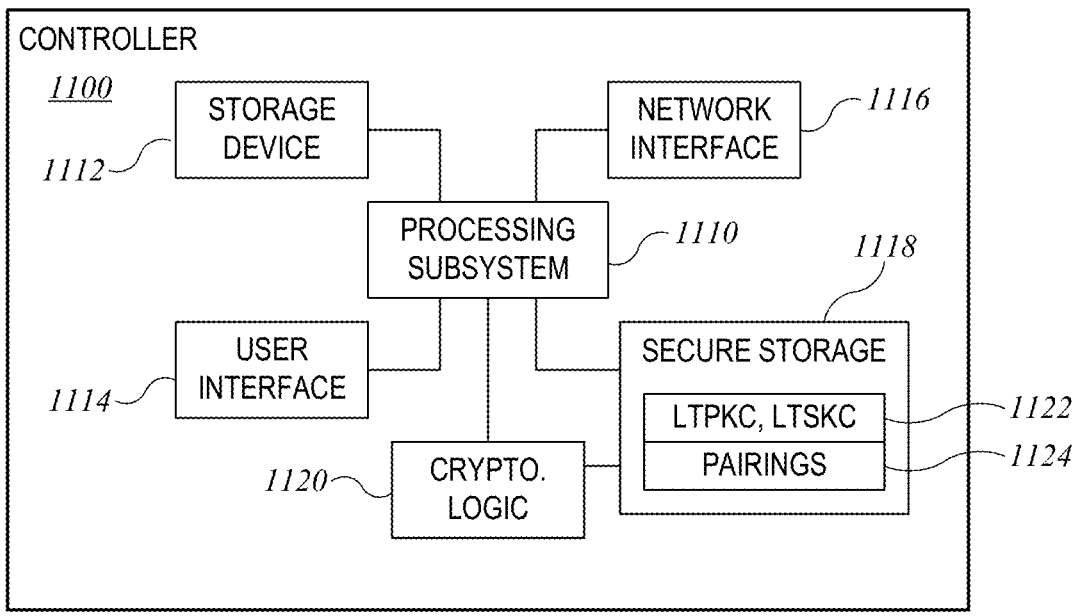
FIG. 11 shows a simplified block diagram of a controller according to an embodiment of the present invention.

FIG. 11 shows a simplified block diagram of a controller 1100, which can be a user device, according to an embodiment of the present invention. Controller 1100 can implement any or all of the controller functions, behaviors, and capabilities described herein, including coordinator functions, as well as other functions, behaviors, and capabilities not expressly described. Controller 1100 can include processing subsystem 1110, storage device 1112, user interface 1114, communication interface 1116, secure storage module 1118, and cryptographic logic module 1120. Controller 1100 can also include other components (not explicitly shown) such as a battery, power controllers, and other components operable to provide various enhanced capabilities. In various embodiments, controller 1100 can be implemented in a desktop computer, laptop computer, tablet computer, smart phone, other mobile phone, wearable computing device, or other systems having any desired form factor. Further, as noted above, controller 1100 can be implemented partly in a base station and partly in a mobile unit that communicates with the base station and provides a user interface.

Storage device 1112 can be implemented, e.g., using disk, flash memory, or any other non-transitory storage medium, or a combination of media, and can include volatile and/or non-volatile media. In some embodiments, storage device 1112 can store one or more application and/or operating system programs to be executed by processing subsystem 1110, including programs to implement various operations described above as being performed by a controller. For example, storage device 1112 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 1112 can also store apps designed for specific accessories or specific categories of accessories (e.g., an IP camera app to manage an IP camera accessory or a security app to interact with door lock accessories). Storage device 1112 can also store other data produced or used by controller 1100 in the course of its operations, including trigger data objects and/or other data pertaining to an environment model.

User interface 1114 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1114 to invoke the functionality of controller 1100 and can view and/or hear output from controller 1100 via output devices of user interface 1114.

Processing subsystem 1110 can be implemented as one or more integrated circuits, e.g., one or more single-core or multi-core microprocessors or microcontrollers, examples of which are known in the art. In operation, processing system 1110 can control the operation of controller 1100. In various embodiments, processing subsystem 1110 can execute a variety of programs in response to program code and can maintain multiple concurrently executing programs or processes. At any given time, some or all of the program code to be executed can be resident in processing subsystem 1110 and/or in storage media such as storage device 1112.

Through suitable programming, processing subsystem 1110 can provide various functionality for controller 1100. For example, in some embodiments, processing subsystem 1110 can implement various processes (or portions thereof) described above as being implemented by a controller. Processing subsystem 1110 can also execute other programs to control other functions of controller 1100, including application programs that may be stored in storage device 1112. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1116 can provide voice and/or data communication capability for controller 1100. In some embodiments communication interface 1116 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1116 can provide wired network connectivity (e.g., Ethernet) in addition to or instead of a wireless interface. Communication interface 1116 can be implemented using a combination of hardware (e.g., driver circuits, antennas, modulators/demodulators, encoders/decoders, and other analog and/or digital signal processing circuits) and software components. In some embodiments, communication interface 1116 can support multiple communication channels concurrently or at different times, using the same transport or different transports.

Secure storage module 1118 can be an integrated circuit or the like that can securely store cryptographic information for controller 1100. Examples of information that can be stored within secure storage module 1118 include the controller's long-term public and secret keys 1122 (LTPKC, LTSKC as described above), and a list of paired accessories 1124 (e.g., a lookup table that maps accessory ID to accessory long-term public key LTPKA for accessories that have completed a pair setup or pair add process as described above).

In some embodiments, cryptographic operations can be implemented in a cryptographic logic module 1120 that communicates with secure storage module 1118. Physically, cryptographic logic module 1120 can be implemented in the same integrated circuit with secure storage module 1118 or a different integrated circuit (e.g., a processor in processing subsystem 1110) as desired. Cryptographic logic module 1120 can include various logic circuits (fixed or programmable as desired) that implement or support cryptographic operations of controller 1100, including any or all cryptographic operations described above. Secure storage module 1118 and/or cryptographic logic module 1120 can appear as a "black box" to the rest of controller 1100. Thus, for instance, communication interface 1116 can receive a message in encrypted form that it cannot decrypt and can simply deliver the message to processing subsystem 1110. Processing subsystem 1110 may also be unable to decrypt the message, but it can recognize the message as encrypted and deliver it to cryptographic logic module 1120. Cryptographic logic module 1120 can decrypt the message (e.g., using information extracted from secure storage module 1118) and determine what information to return to processing subsystem 1110. As a result, certain information can be available only within secure storage module 1118 and cryptographic logic module 1120. If secure storage module 1118 and cryptographic logic module 1120 are implemented on a single integrated circuit that executes code only from an internal secure repository, this can make extraction of the information extremely difficult, which can provide a high degree of security. Other implementations are also possible.

Figure 12:
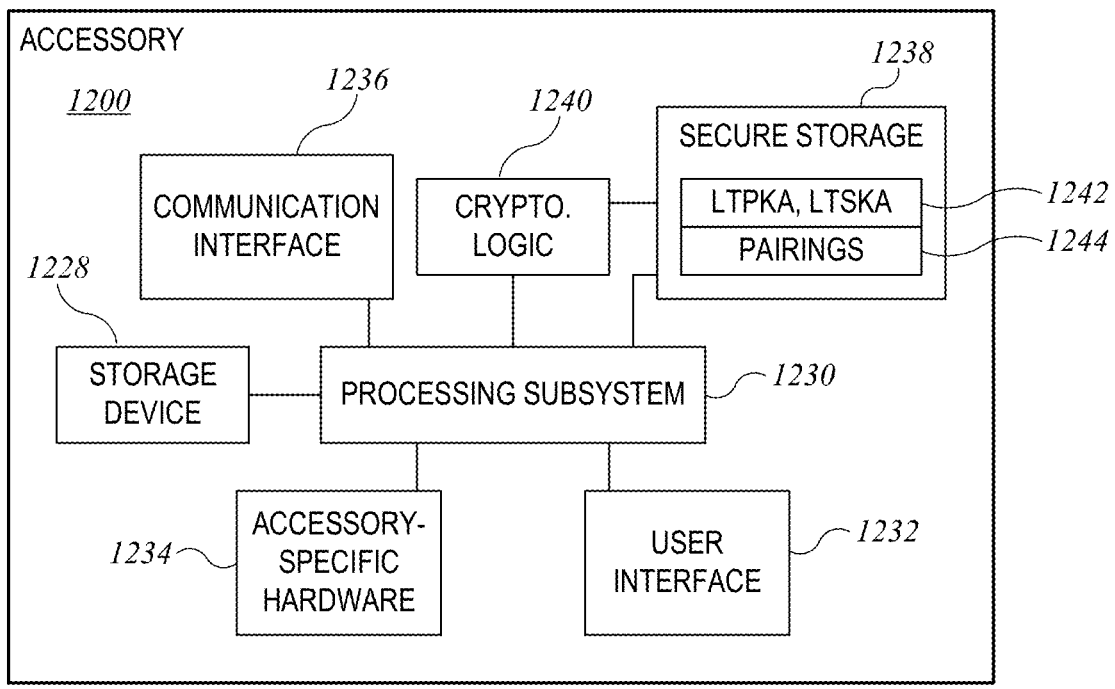
FIG. 12 shows a simplified block diagram of an accessory according to an embodiment of the present invention.

FIG. 12 shows a simplified block diagram of an accessory 1200 according to an embodiment of the present invention. Accessory 1200 can implement any or all of the accessory functions, behaviors, and capabilities described herein, as well as other functions, behaviors, and capabilities not expressly described. Accessory 1200 can include storage device 1228, processing subsystem 1230, user interface 1232, accessory-specific hardware 1234, communication interface 1236, secure storage module 1238, and cryptographic logic module 1240. Accessory 1200 can also include other components (not explicitly shown) such as a battery, power controllers, and other components operable to provide various enhanced capabilities.

Accessory 1200 is representative of a broad class of accessories that can be operated by a controller such as controller 1100, and such accessories can vary widely in capability, complexity, and form factor. Various accessories may include components not explicitly shown in FIG. 12, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1228 can be implemented, e.g., using disk, flash memory, or any other non-transitory storage medium, or a combination of media, and can include volatile and/or non-volatile media. In some embodiments, storage device 1228 can store one or more programs (e.g., firmware) to be executed by processing subsystem 1230, including programs to implement various operations described above as being performed by an accessory, as well as operations related to particular accessory behaviors. Storage device 1228 can also store an accessory object or accessory definition record that can be furnished to controller devices, e.g., during device discovery as described in above-referenced U.S. application Ser. No. 14/614,914. Storage device 1228 can also store accessory state information and any other data that may be used during operation of accessory 1200.

Processing subsystem 1230 can include, e.g., one or more single-core or multi-core microprocessors and/or microcontrollers executing program code to perform various functions associated with accessory 1200. For example, processing subsystem 1230 can implement various processes (or portions thereof) described above as being implemented by an accessory, e.g., by executing program code stored in storage device 1228. Processing subsystem 1230 can also execute other programs to control other functions of accessory 1200. In some instances programs executed by processing subsystem 1230 can interact with a controller (e.g., controller 1100), e.g., by generating messages to be sent to the controller and/or receiving messages from the controller.

User interface 1232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1200, a user can operate input devices of user interface 1232 to invoke functionality of accessory 1200 and can view and/or hear output from accessory 1200 via output devices of user interface 1232. Some accessories may provide a minimal user interface or no user interface. at all. Where the accessory does not have a user interface, a user can still interact with the accessory using a controller (e.g., controller 1100).

Accessory-specific hardware 1234 can include any other components that may be present in accessory 1200 to enable its functionality. For example, in various embodiments accessory-specific hardware 1234 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1234 and that accessory-specific hardware can include mechanical as well as electrical or electronic components.

Communication interface 1236 can provide voice and/or data communication capability for accessory 1200. In some embodiments communication interface 1236 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1236 can provide wired network connectivity (e.g., Ethernet) in addition to or instead of a wireless interface. Communication interface 1236 can be implemented using a combination of hardware (e.g., driver circuits, antennas, modulators/demodulators, encoders/decoders, and other analog and/or digital signal processing circuits) and software components. In some embodiments, communication interface 1236 can support multiple communication channels concurrently or at different times, using the same transport or different transports.

Secure storage module 1238 can be an integrated circuit or the like that can securely store cryptographic information for accessory 1200. Examples of information that can be stored within secure storage module 1238 include the accessory's long-term public and secret keys 1242 (LTPKA, LTSKA as described above), and a list of paired controllers 1244 (e.g., a lookup table that maps controller ID to controller long-term public key LTPKC for controllers that have completed a pair setup or pair add process as described above). In some embodiments, secure storage module 1238 can be omitted; keys and lists of paired controllers can be stored in storage device 1228.

In some embodiments, cryptographic operations can be implemented in a cryptographic logic module 1240 that communicates with secure storage module 1238. Physically, cryptographic logic module 1240 can be implemented in the same integrated circuit with secure storage module 1238 or a different integrated circuit (e.g., a processor in processing subsystem 1230) as desired. Cryptographic logic module 1240 can include various logic circuits (fixed or programmable as desired) that implement or support cryptographic operations of accessory 1200, including any or all cryptographic operations described above. Secure storage module 1238 and/or cryptographic logic module 1240 can appear as a "black box" to the rest of accessory 1200. Thus, for instance, communication interface 1236 can receive a message in encrypted form that it cannot decrypt and can simply deliver the message to processing subsystem 1230. Processing subsystem 1230 may also be unable to decrypt the message, but it can recognize the message as encrypted and deliver it to cryptographic logic module 1240. Cryptographic logic module 1240 can decrypt the message (e.g., using information extracted from secure storage module 1238) and determine what information to return to processing subsystem 1230. As a result, certain information can be available only within secure storage module 1238 and cryptographic logic module 1240. If secure storage module 1238 and cryptographic logic module 1240 are implemented on a single integrated circuit that executes code only from an internal secure repository, this can make extraction of the information extremely difficult, which can provide a high degree of security. Other implementations are also possible.

Accessory 1200 can be any electronic apparatus that interacts with controller 1100. In some embodiments, controller 1100 can provide remote control over operations of accessory 1200 as described above. For example controller 1100 can provide a remote user interface for accessory 1200 that can include both input and output controls (e.g., a display screen to display current status information obtained from accessory 1200 and an input control such as a touchscreen overlay to allow changes to the status information). Controller 1100 in various embodiments can control any function of accessory 1200 and can also receive data from accessory 1200.

It will be appreciated that the system configurations and components described herein are illustrative and that variations and modifications are possible. It is to be understood that an implementation of controller 1100 can perform all operations described above as being performed by a controller and that an implementation of accessory 1200 can perform any or all operations described above as being performed by an accessory. A proxy, bridge, tunnel, or coordinator can combine components of controller 1100 and accessory 1200, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controller networks and/or accessory networks can include as many or as few devices as desired. In some embodiments, any controller can operate as a coordinator; in other embodiments, operation as a coordinator can be limited to certain types of devices (e.g., based on manufacturer, model, and/or system software supported). In some embodiments, a controller that is capable of operating as a coordinator (referred to herein as "CD-capable") is only permitted to operate as a coordinator when it is on a local area network associated with the environment having the accessories to be controlled; however, this limitation is not required, and some embodiments may allow an offsite coordinator.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
    identifying, by a computing device, that the computing device is capable of being a coordinator device in an automated environment comprising at least one controller device and at least one accessory device, the computing device being capable of being a coordinator based at least in part on being configured to at least transmit a control instruction to the at least one accessory device and resolve conflicts of conflicting instructions between a plurality of controller devices in the automated environment that includes the at least one controller device, the conflicts being resolved based at least in part on one or more rules associated with the at least one controller device;
    determining, by the computing device, that the computing device has become eligible to be the coordinator device in the automated environment;
    determining, by the computing device, whether a second computing device is an incumbent coordinator device in the automated environment; and
    in accordance with a determination that the second computing device is the incumbent coordinator device in the automated environment:
        determining, by the computing device, whether the computing device would defeat the incumbent coordinator device; and
        in accordance with a determination that the computing device would defeat the incumbent coordinator device:
            initiating, by the computing device, an election of a new coordinator device for the automated environment; and
            designating, by the computing device, the computing device as the new coordinator device based at least in part on the election.

2. The method of claim 1, further comprising:
    in accordance with a determination that the second computing device is not the incumbent coordinator device:
        determining, by the computing device, whether another device in the automated environment is eligible to be the coordinator device.

3. The method of claim 2, further comprising
    in accordance with a determination, that another device in the automated environment is eligible to be the coordinator device:
        initiating, by the computing device, the election of a new coordinator device for the automated environment.

4. The method of claim 2, further comprising
    in accordance with a determination, that no other device in the automated environment is eligible to be the coordinator device:
        designating, by the computing device, the computing device as the coordinator device.

5. The method of claim 1, wherein the determination of whether the computing device would defeat the incumbent coordinator device comprises performing a hypothetical election between the computing device and the incumbent coordinator device.

6. The method of claim 5, wherein performing the hypothetical election comprises applying one or more priority rules in a preliminary determination without changing a coordinator designation of the incumbent coordinator device.

7. The method of claim 1, wherein the computing device comprises a controller device.

8. The method of claim 1, wherein the automated environment is configured with only one coordinator at a time.

9. The method of claim 1, wherein the automated environment comprises a local area network.

10. The method of claim 9, wherein the determination that the computing device has become eligible to be the coordinator device is based at least in part on detecting that the computing device has connected to the local area network or has entered a geofence corresponding to the automated environment.

11. The method of claim 1, wherein the determination of whether the second computing device is the incumbent coordinator device in the automated environment is based at least in part on detecting a coordinator identifier in a descriptor dataset of the second computing device.

12. A non-transitory computer-readable storage medium having stored thereon computer-executable instructions that, when executed by one or more processors of a computing device, cause the computing device to perform operations comprising:
  identifying that the computing device is capable of being a coordinator device in an automated environment comprising at least one controller device and at least one accessory device, the computing device being capable of being a coordinator based at least in part on being configured to at least transmit a control instruction to the at least one accessory device and resolve conflicts of conflicting instructions between a plurality of controller devices in the automated environment that includes the at least one controller device, the conflicts being resolved based at least in part on one or more rules associated with the at least one controller device;
  determining that the computing device has become eligible to be the coordinator device in the automated environment;
  determining whether a second computing device is an incumbent coordinator device in the automated environment; and
  in accordance with a determination that the second computing device is the incumbent coordinator device in the automated environment:
    determining whether the computing device would defeat the incumbent coordinator device; and
    in accordance with a determination that the computing device would defeat the incumbent coordinator device:
      initiating an election of a new coordinator device for the automated environment; and
      designating the computing device as the new coordinator device based at least in part on the election.

13. The non-transitory computer-readable storage medium of claim 12, wherein the determination of whether the computing device would defeat the incumbent coordinator device comprises performing a hypothetical election between the computing device and the incumbent coordinator device.

14. The non-transitory computer-readable storage medium of claim 13, wherein performing the hypothetical election comprises applying one or more priority rules in a preliminary determination without changing a coordinator designation of the incumbent coordinator device.

15. The non-transitory computer-readable storage medium of claim 12, wherein the automated environment comprises a local area network.

16. The non-transitory computer-readable storage medium of claim 15, wherein the determination that the computing device has become eligible to be the coordinator device is based at least in part on detecting that the computing device has connected to the local area network or has entered a geofence corresponding to the automated environment.

17. A computing device, comprising:
  one or more memories storing computer-executable instructions; and
  one or more processors coupled to the one or more memories, the one or more processors configured to perform operations comprising:
    identifying that the computing device is capable of being a coordinator device in an automated environment comprising at least one controller device and at least one accessory device, the computing device being capable of being a coordinator based at least in part on being configured to at least transmit a control instruction to the at least one accessory device and resolve conflicts of conflicting instructions between a plurality of controller devices in the automated environment that includes the at least one controller device, the conflicts being resolved based at least in part on one or more rules associated with the at least one controller device;
    determining that the computing device has become eligible to be the coordinator device in the automated environment;
    determining whether a second computing device is an incumbent coordinator device in the automated environment; and
    in accordance with a determination that the second computing device is the incumbent coordinator device in the automated environment:
      determining whether the computing device would defeat the incumbent coordinator device; and
      in accordance with a determination that the computing device would defeat the incumbent coordinator device:
        initiating an election of a new coordinator device for the automated environment; and
        designating the computing device as the new coordinator device based at least in part on the election.

18. The computing device of claim 17, wherein the determination of whether the computing device would defeat the incumbent coordinator device comprises performing a hypothetical election between the computing device and the incumbent coordinator device.

19. The computing device of claim 18, wherein performing the hypothetical election comprises applying one or more priority rules in a preliminary determination without changing a coordinator designation of the incumbent coordinator device.

20. The computing device of claim 17, wherein the automated environment comprises a local area network, and wherein the determination that the computing device has become eligible to be the coordinator device is based at least in part on detecting that the computing device has connected to the local area network or has entered a geofence corresponding to the automated environment.

* * * * *